United States Patent [19]
Webb et al.

[11] Patent Number: 4,969,108
[45] Date of Patent: Nov. 6, 1990

[54] VISION SEAM TRACKING METHOD AND APPARATUS FOR A MANIPULATOR

[75] Inventors: Gregory Webb; Keith R. Wehmeyer, both of Cincinnati, Ohio

[73] Assignee: Cincinnati Milacron Inc., Cincinnati, Ohio

[21] Appl. No.: 179,505

[22] Filed: Apr. 8, 1988

[51] Int. Cl.⁵ .......................................... G06F 15/00
[52] U.S. Cl. ............................... 364/513; 219/124.34; 901/42; 901/47
[58] Field of Search .................. 364/513; 901/42, 47; 219/124.34

[56] References Cited

U.S. PATENT DOCUMENTS

| | | | |
|---|---|---|---|
| 3,986,007 | 10/1976 | Ruoff, Jr. .............................. | 364/513 |
| 4,370,721 | 1/1983 | Berenberg et al. ............. | 364/474.35 |
| 4,380,696 | 4/1983 | Masaki .............................. | 219/124.34 |
| 4,403,281 | 9/1983 | Holmes et al. ...................... | 364/170 |
| 4,417,127 | 11/1983 | Nachev et al. .................. | 219/124.34 |
| 4,456,961 | 6/1984 | Price et al. ........................... | 364/191 |
| 4,492,847 | 1/1985 | Masaki et al. ....................... | 364/513 |
| 4,493,968 | 1/1985 | Brown . | |
| 4,497,996 | 2/1985 | Libby, Jr. et al. ............. | 219/124.34 |
| 4,538,233 | 8/1985 | Resnick et al. ..................... | 364/513 |
| 4,542,279 | 9/1985 | Case, Jr. et al. .............. | 219/124.34 |
| 4,590,356 | 5/1986 | Povlick .......................... | 219/124.34 |
| 4,590,577 | 5/1986 | Nio et al. ............................ | 364/477 |
| 4,591,689 | 5/1986 | Brown et al. . | |
| 4,616,326 | 10/1987 | Meier et al. ........................ | 364/513 |
| 4,621,185 | 11/1986 | Brown . | |
| 4,635,206 | 1/1987 | Bhatia et al. ....................... | 364/474 |
| 4,727,471 | 2/1988 | Driels et al. ..................... | 364/167.01 |
| 4,761,596 | 8/1988 | Nio et al. ............................ | 364/513 |
| 4,815,006 | 3/1989 | Andersson et al. ................. | 364/513 |
| 4,843,287 | 6/1989 | Taft ................................ | 364/167.01 |

OTHER PUBLICATIONS

"Control Strategy for an Arc-Welding Robot Under Sensory Guidance", W. J. P. A. Verbeek et al., Proceedings of 5th Int'l Conf. on Robot Vision & Sensory Control, 10/85.
Oldelft Seampilot brochure.

Primary Examiner—Allen MacDonald
Attorney, Agent, or Firm—Frost & Jacobs

[57] ABSTRACT

A three-dimensional vision seam tracking method and apparatus for controlling the motion of the center point of a tool mounted on a manipulator. The manipulator is provided with a control to operate the manipulator members to move the tool center point at programmed velocities along a programmed path corresponding to the seam. The manipulator is provided with a vision system including a laser scanner/camera head mounted ahead of the function element. The control is programmed with dynamically varying orientation angles to control the orientation of the tool during seam tracking. The laser scanner/camera head scans the seam at predetermined time intervals. A set of coordinates for the center point of the seam in a coordinate system relative to the camera is provided for each scan. The sets of camera coordinates are transformed to the coordinate system of the manipulator using transformation matrices employing the orientation angles in effect at the time of the scan for the set of camera coordinates being transformed. The transformed coordinates are stored in a FIFO buffer until needed. The seam tracking routine of the manipulator control removes FIFO entries at some later time and alters the manipulator's programmed path to move the tool center point along the seam.

14 Claims, 13 Drawing Sheets

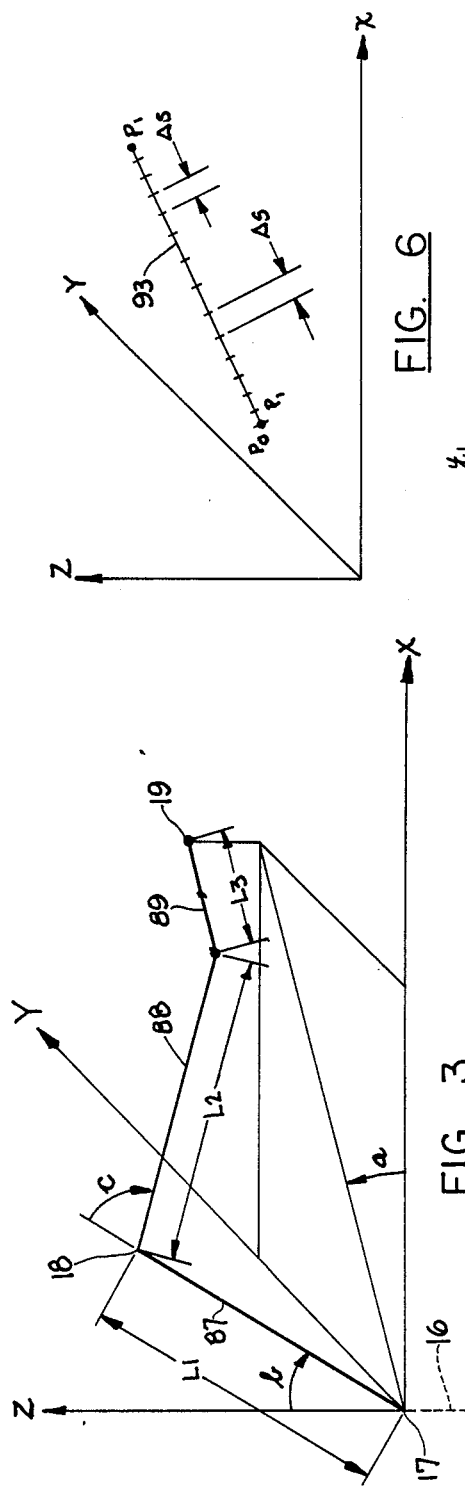
FIG. 3
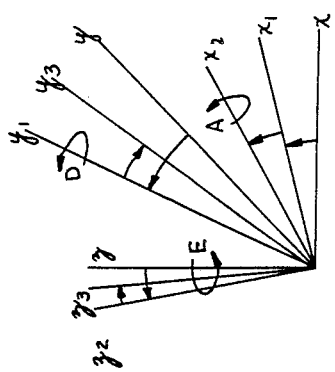
FIG. 6
FIG. 5
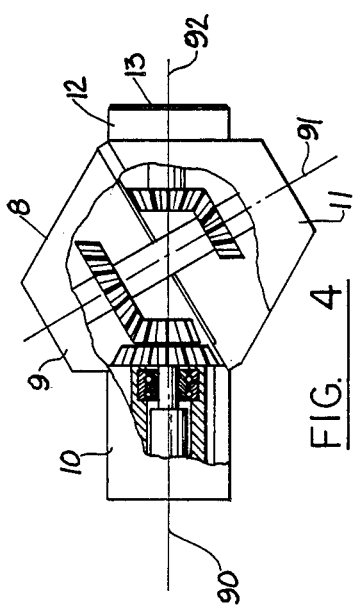
FIG. 4

$\overline{U_1} = P_{S1} - P_{K-1}$ $\overline{U_1} = X_{S1} - X_{K-1}, Y_{S1} - Y_{K-1}, Z_{S1} - Z_{K-1}$ $S_T = \sqrt{(X_{S1} - X_{K-1})^2 + (Y_{S1} - Y_{K-1})^2 + (Z_{S1} - Z_{K-1})^2}$ $X_{SK} = X_{K-1} + \Delta S \left(\dfrac{Y_{S1} - X_{K-1}}{S_T}\right)$ $Y_{SK} = Y_{K-1} + \Delta S \left(\dfrac{Y_{S1} - Y_{K-1}}{S_T}\right)$ $Z_{SK} = Z_{K-1} + \Delta S \left(\dfrac{Z_{S1} - Z_{K-1}}{S_T}\right)$

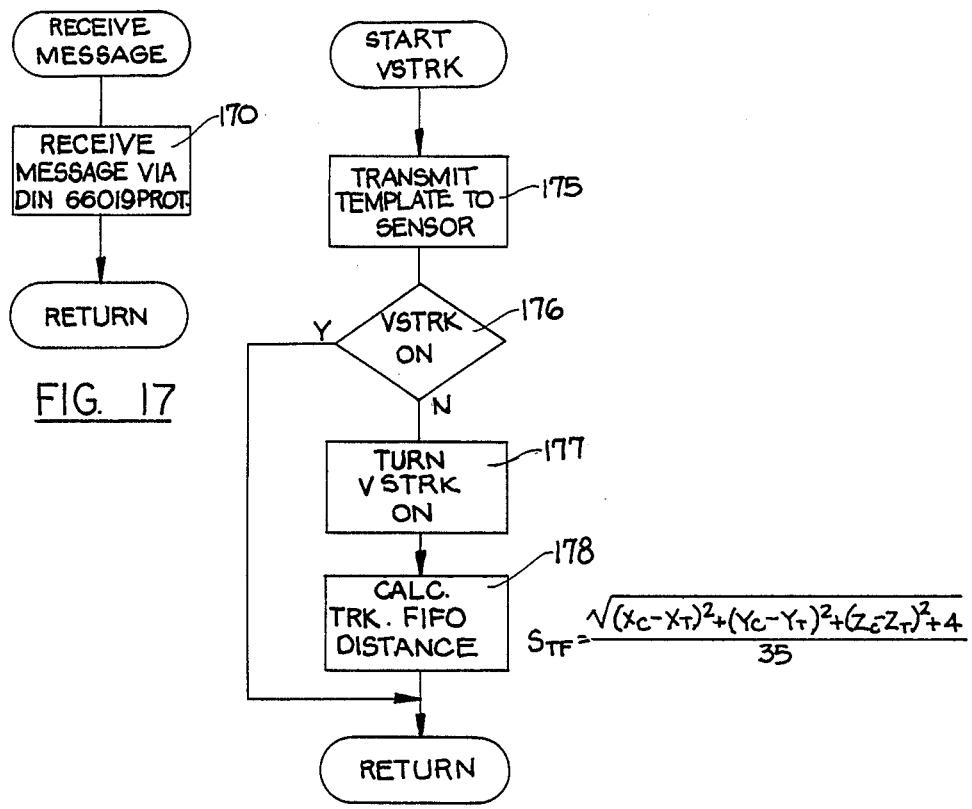
FIG. 17
FIG. 18
$$S_{TF} = \frac{\sqrt{(x_C-x_T)^2+(y_C-y_T)^2+(z_C-z_T)^2}+4}{35}$$
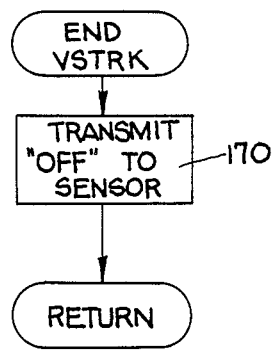
FIG. 20
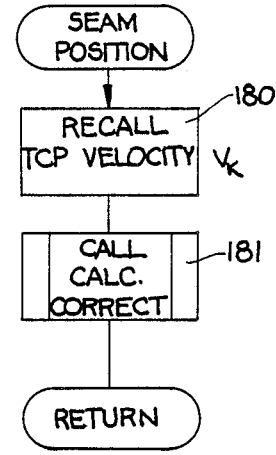
FIG. 21

VISION SEAM TRACKING METHOD AND APPARATUS FOR A MANIPULATOR

TECHNICAL FIELD

The invention relates to a three-dimensional vision seam tracking system for a manipulator, and more particularly to such a system capable of compensating for dynamically varying orientation angles.

BACKGROUND ART

A manipulator provided with the vision seam tracking system of the present invention can be employed in many processing applications including applying sealant, contour mapping and, in general, in any processing application requiring adaptive path control. For purposes of an exemplary showing, the invention will be taught in its application to seam welding.

Once a manipulator is taught a program, it will move along the programmed path with high repeatability. While this is satisfactory for many applications, others require adaptive path control. For example, in a welding operation, if the parts being joined are not uniform in seam or joint location by virtue of manufacturing tolerances, heat distortion, or the like, the manipulator will weld along its taught path, even though the seam may be located elsewhere.

In order to overcome this problem, and to broaden the applications in which manipulators can be used, prior art workers have devised a number of vision guided seam tracking systems. The teachings of U.S. Pat. Nos. 4,542,279 and 4,590,356 are exemplary of such systems. In general, the prior art approach has required the vision system to guide the manipulator. Because of the guidance requirement, constraints are put on the prior art systems. Furthermore, prior art systems generally require a constant relationship between the camera and the part, inhibiting orientation changes while tracking takes place.

As applications for vision-guided welding systems increase in complexity, more processing and interpretation of data are required. Prior art workers have attempted to maximize the processing capabilities of the vision guiding equipment. A major drawback to this approach, however, lies in the requirement for large amounts of manipulator information in order to make the necessary coordinate transformations and to control the entire weld process, resulting in communication and performance limitations. As a further problem, the large amounts of manipulator information must be processed in real time.

The present invention is based upon the concept of guiding the manipulator by means of the manipulator control and requiring of the vision system only data as to the position of the seam in camera coordinates. The present invention includes means for taking camera data in camera coordinates and transforming the camera coordinates to manipulator coordinates independently of orientation angles. Matrices are used which accommodate the attitudinal changes at the camera introduced by changes of the orientation angles. The manipulator control has access to and the capability of processing the large quantity of manipulator data (position, orientation, etc.) required to build the transformation matrices. The result is a vision seam tracking method and apparatus capable of compensating for dynamically varying orientation angles. The manipulator's orientation angles may be user programmed as required by the weld process to achieve desired attack and push/pull angles and the like, without degrading tracking performance. This capability allows the welding of many parts which could not be performed if the orientation angles had to remain fixed.

DISCLOSURE OF THE INVENTION

In accordance with the invention there is provided a three-dimensional vision seam tracking method and apparatus for a manipulator. The manipulator is provided with a vision system including a laser scanner/camera head which previews the seam to be welded ahead of the weld torch. Data from the vision system is supplied to the manipulator control. The manipulator control derives from manipulator data matrices bY which the vision system data in camera coordinates can be transformed to manipulator coordinates. The transformed data is stored in a FIFO buffer until required. The orientation angles of the manipulator can be user preprogrammed and can vary dynamically throughout the seam welding process, without degrading the seam tracking function. The seam tracking routine of the manipulator control removes FIFO entries at some later time and then alters the manipulator's preprogrammed path to pass through them.

BRIEF DESCRIPTION OF THE DRAWINGS

FIG. 3 is a schematic representation of the manipulator shown in the manipulator coordinates.

FIG. 4 is an elevational view, partly in cross section, illustrating the manipulator wrist and its axes of rotation.

FIG. 5 is a schematic representation of the hand coordinate system and the orientation angles D, E, R.

FIG. 6 is a schematic representation depicting the motion effected by the controlled manipulator in an automatic mode of operation.

FIG. 17 is a flow chart representing the message handling procedure of the vision data processor.

FIG. 18 is a flow chart illustrating the procedure for activating the vision system utilizing a user defined template.

FIG. 20 is a flow chart illustrating the procedure for deactivating the vision system FIG. 21 is a flow chart depicting the overall procedure for producing coordinates of an intermediate point on the linear path to the seam coordinates.

DETAILED DESCRIPTION OF THE INVENTION

Figure 1:
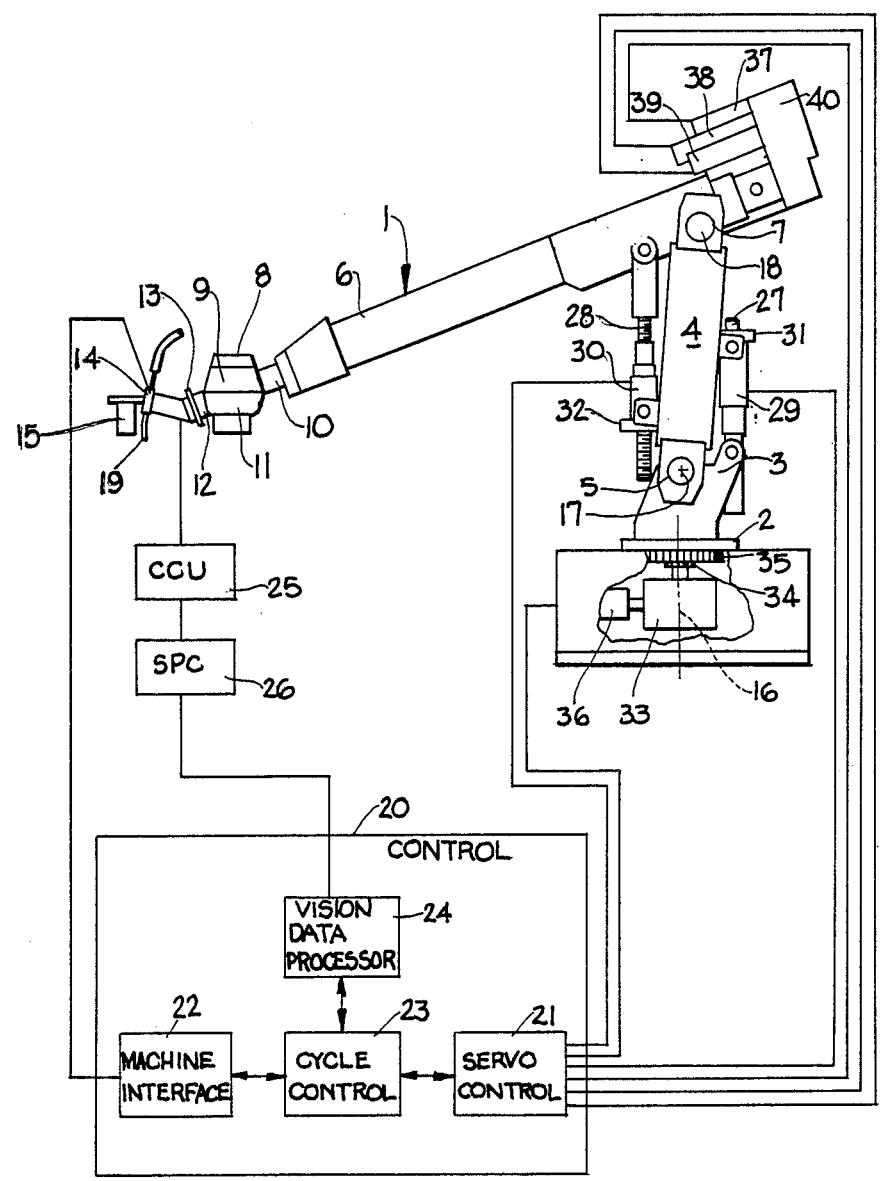
FIG. 1 is a simplified, diagrammatic representation of an industrial manipulator and its control, provided with the vision seam tracking system of the present invention.

For a thorough understanding of the vision guided seam tracking method and apparatus of the present invention, it will be necessary to describe an exemplary manipulator and its control. To this end, FIG. 1 illustrates a manipulator corresponding to those manufactured by Cincinnati Milacron Industries, Inc., the assignee of the present invention. The manipulator shown is exemplary only, and the present invention may be applied to any appropriate six- degrees-of-freedom mechanical manipulator. While the detailed description of the preferred embodiment will necessarily reflect the actual implementation, such detail should not be construed as limitations on the present invention as defined in the appended claims.

Referring to FIG. 1, an exemplary robot or manipulator is generally indicated at 1. The manipulator 1 comprises a base plate 2 supporting an upstanding base member 3. An upper arm 4 is pivotally affixed to base member 3 at pivot 5. A forearm 6 is pivotally attached to upper arm 4 at pivot 7.

At its free forward end, the forearm 6 supports a wrist 8. As is known in the art, the wrist 8 comprises a first segment 9 having an integral shaft portion 10 rotatably supported within forearm 6 and having an ax is parallel to or coincident with the longitudinal center line of forearm 6. Wrist 8 further comprises a second segment 11 rotatively mounted on first segment 9 and having an integral shaft portion 12. The shaft 12 terminates in a face plate 13. Affixed to face plate 13 there is a welding tool 14 and the laser scanner/camera head 15 of the vision system to be described hereinafter.

The manipulator 1 is so constructed that motion of its members describe axes of rotation. The first axis is the vertical base axis shown in broken lines at and defined by rotation of base plate 2 and base member 3. The upper arm 4 rotates about horizontal shoulder axis 17 through the center of pivot 5. The forearm 6 rotates about the horizontal elbow axis 18 extending through the center of pivot 7.

Wrist 8 provides three more axes of rotation. The first is rotation of segment 9 about the axis of shaft 10. The second is rotation of segment 11 about an axis perpendicular to the abutting surfaces of segments 9 and 11. The third comprises the axis about which face plate 13 rotates, which axis is perpendicular to the face plate.

Rotations about base axis 16, shoulder axis 17 and elbow axis 18 define the operating envelope of the center point 19 of tool 14. Rotations of wrist segment 9, wrist segment 11, and face plate 13 about their respective axes control orientations of the tool 14 and laser scanner/camera head 15 at the programmed locations in accordance with programmed orientation angles.

The manipulator control is diagrammatically indicated at 20. Each of the six axes of motion is servo controlled by connection of command and feed back signals to servo control 21 of control 20. Operation of welding tool 14 is accomplished by a machine interface 22 which responds to the programmed cycle of operation controlled by the cycle control 23. The cycle control 23 operates upon stored location, velocity and function data to produce control signals for the servo control 21 and the machine interface 22. In this particular exemplary instance, the tool 14 is a welding torch and control of the welding process is effected through the machine interface in response to stored function signals. Control 20 also incorporates a vision data processor 24 which receives information from the vision sytem comprising the laser scanner/camera head 15, a camera control unit 25 and a signal processing computer 26. The vision system will be further described hereinafter.

Rotations of the upper arm 4 and the forearm 6 about their respective axes are achieved by linear motions of screws 27 and 28 through nuts 29 and 30, respectively. Rotation of the nuts 29 and 30 is imparted through pulleys 31 and 32, respectively, by drive motors not shown. Rotation of base plate 2 and base member 3 is accomplished through transmission 33 driving pinion 34 which, in turn, drives ring gear 35 affixed to base plate 2. The drive to transmission 33 is provided by motor 36.

Rotation of wrist segments 9 and 11 and face plate 13 is accomplished through concentric torque tubes (not shown) within forearm 6 and driven by motors 7, 38 and 39 through transmission 40. Position signals for each movable manipulator member are produced by position transducers (such as resolvers) which may be mechanically driven by motion of the manipulator movable members, themselves, or the drive motors therefor.

Figure 2:
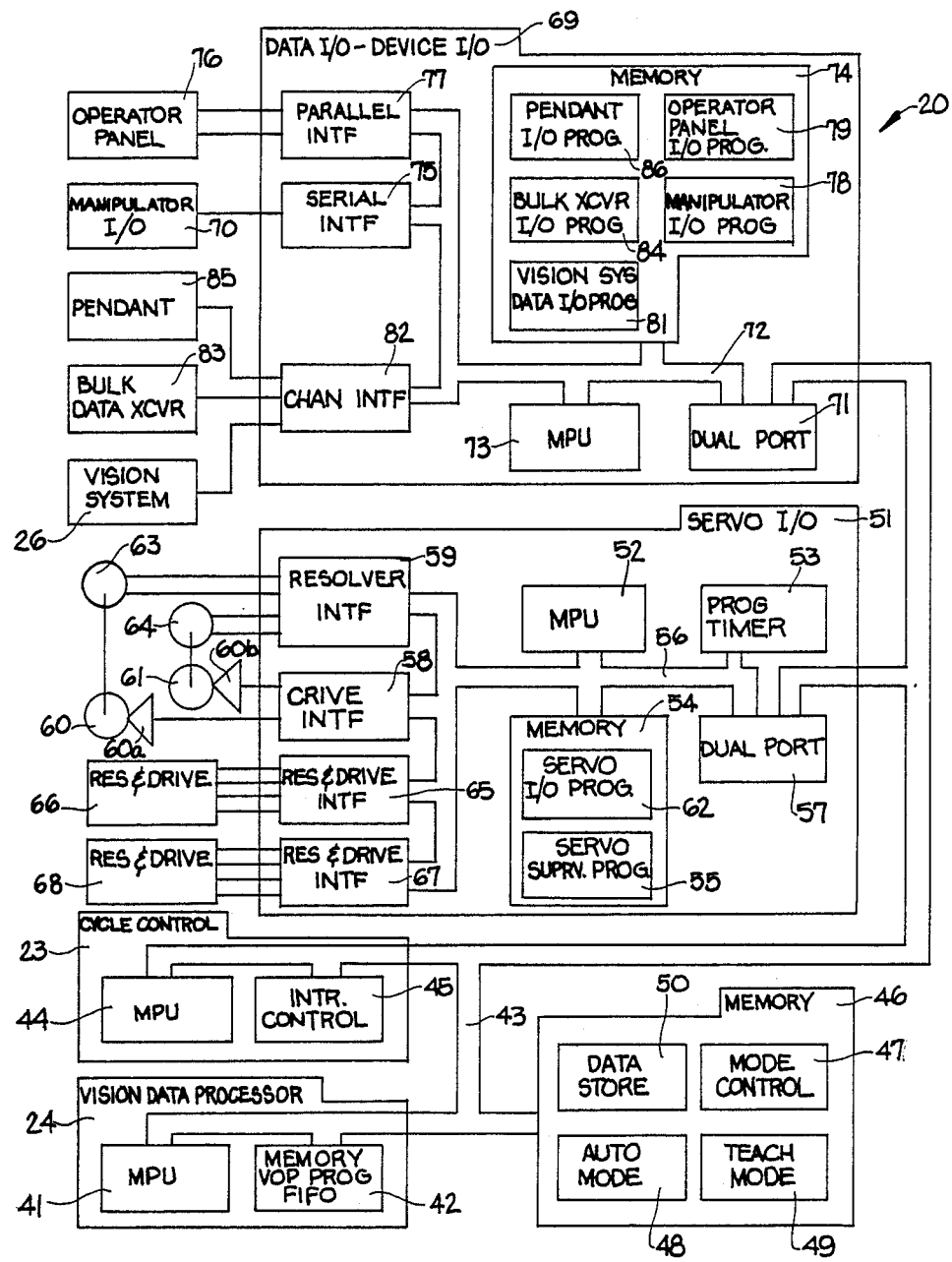
FIG. 2 is a block diagram of the control of FIG. 1.

Reference is now made to FIG. 2 which constitutes a block diagram for the control 20 of FIG. 1. The control 20 is implemented using a plurality of microprocessors communicating through a common bus. Applicants have chosen the commercially available 80186 microprocessor produced by Intel Corporation. It will be understood by those skilled in the art that other appropriate general purpose digital computers could be used to implement the control algorithms to be described hereinafter.

As indicated above, the control 20 includes a vision data processor 24. The vision data processor 24 includes a microprocessor 41 and a memory 42 both tied directly to the system bus 43. The purpose of vision data processor 24 will be more fully described hereinafter.

Cycle control 23 includes a microprocessor 44 and an interrupt control 45, both tied directly to the system bus 43. Operating system programs executed by microprocessor 44 are stored in memory 46 and include programs identified as mode control 47, auto mode 48, and teach mode 49. Data defining the user specified locations, velocities and functions are stored in data store 50. Memory 46 is connected directly to system bus 43. The set of programs identified as auto mode 48 is used by microprocessor 44 to execute the cycle of operation defined by the data stored in data store 50. Execution of the auto mode programs is carried out by microprocessor 44 independently until execution is interrupted by an interrupt signal processed by interrupt control 45.

Servo control 21 (FIG. 1) is shown at 51 in FIG. 2 and includes a servo supervisor which processes servo command signals produced by cycle control 23 and the servo input/output modules to be described, and associated with the actual control of the manipulator axis drive motors. The servo supervisor comprises a microprocessor 52, a programmable timer 53 and a local memory 54 which contains the servo control process programs 55. Servo interrupt signals are periodically produced by the programmable timer 53. The period between interrupt signals defines the interval of each iteration of path control procedures executed by cycle control 23. The elements comprising the servo supervisor receive manipulator axes command signals representing increments of motion of the manipulator relative to its axes of rotation to be effected during the iteration interval. These manipulator axis command signals are processed by the servo supervisor to produce servo command signals defining sub-increments for each of the manipulator axes effective for sub-divisions of the iteration interval. The servo command signals are distributed to the servo input/output modules at predefined sub-intervals of the iteration interval. The servo input/output modules use the servo command signals and feedback signals produced by position transducers to control the manipulator axes drive motors. It will be noted that elements 52, 53 and 54 are connected to a local bus 56 which, in turn, is connected to the system bus 43 through dual port 57.

Servo input/output is accomplished by microprocessor 52, and memory 54, through drive interface circuitry 58, and manipulator axis position measuring transducer interface 59. These elements are interconnected by local bus 56. Microprocessor 52 controls manipulator axis drive motors 60 and 61 through amplifiers 60a and 60b in response to the servo command signals and the feedback signals according to servo input/output programs 62 stored in memory 54. Each manipulator axis servo command signal is compared to the corresponding current position signal as defined by position transducer 63 or 64 to produce a position error signal which is then applied to the drive interface circuitry 58 to produce a drive control signal for application to the associated manipulator axis drive motor.

It will be noted that the block diagram of FIG. 2 illustrates servo input/output interfaces represented by blocks 65 and 67. It will be understood that each of blocks 65 and 67 represent both a driver interface circuitry similar to drive interface circuitry 58 and a machine axis position measuring transducer interface similar to that shown at 59. It will further be understood that each of blocks 66 and represents two drive motors and an amplifier and a resolver associated with each. Servo command signals represent increments of manipulator axis motion to be effected within a few milliseconds. By contrast, the manipulator axis command signals represent increments of manipulator member motion to be effected within the iteration interval of 10 to 20 milliseconds.

In addition to the generation of the manipulator axis command signals, cycle control 23 controls the execution of functions represented by input signals and associated with the tool 14 (FIG. 1) to be performed at programmed locations. Function commands are stored with the program data in data store 50 and are executed in accordance with function execution subroutines associated with the auto mode programs 48. Control of manipulator functions is effected through input/output devices, such as limit switches, push buttons, relays and solenoids. The manipulator input/output devices are directly controlled by the data input/output-device input/output board 69 in cooperation with the machine input/output interface circuitry 70. Data is transferred to and from the system bus 43 through dual port device 71. The dual port device 71 is connected to the local bus 72 of board 69. Operation of board 69 is controlled by the local microprocessor 73 connected to bus 72 which executes programs stored in local memory 74.

Connection of the manipulator input/output interface circuitry 70 to board 69 is accomplished through a serial interface circuit 75. A control cabinet operator panel 76 is connected by parallel lines to a parallel interface circuit 77. Monitoring and control of the interface circuits 75 and 77 are accomplished by the microprocessor 73 in response to respectively the manipulator input/output program 78 and the operator panel input/output program 79 stored in local memory 74. Current conditions of the manipulator input/output devices are reflected in device status signals transferred from the panel 69 through the dual port device 71 to the cycle control 23. Function command signals produced by cycle control 23 in accordance with the stored program of operation are transferred over system bus 43 through dual port 71 and ultimately to the appropriate manipulator input/output interface device by the serial interface 75.

In addition to signal exchange between manipulator device interfaces, the control permits exchange of data through the panel 69 and its associated interfaces. While the cycle control 23 is operating under the auto mode programs 48, location data may be exchanged in response to function commands. This in-process data exchange takes place between the vision system signal processing computer 26 (see also FIG. 1) and the control 20 through panel 69. Location data from the data store 50 is transferred from system bus 43 to panel 69 through its dual port device 71. The microprocessor 73 operating under control of the vision system data input/output program 81 stored in its local memory 74 transfers the initialization data from dual port device 71 to the serial channel interface 82 for transmission to vision system signal processing computer 26. In reverse, data from the vision system signal processing computer 26 is input to the serial channel interface 82 and transferred therefrom on local bus 72 to the dual port device 71. From there data is available to the vision data processor 24 on system bus 43.

In addition to the in-process data exchange just described, program data may be exchanged between data store 50 of memory 46 and a bulk data store through a bulk data transceiver 83. Examples of a bulk data store include serial tape and data disk devices. Data is exchanged by microprocessor 73 operating in response to the bulk data transceiver input/output program 84 stored in memory 74. Data is transferred to and from the bulk data transceiver 83 through the serial channel interface 82 to the local bus 72 and through the dual port device 71 connected to system bus 43.

A final data input/output device, the teach pendant 85, is associated with the execution of teach mode programs 49 by the cycle control 23. Location and function data defining a programmed cycle of operation may be generated by an operator using the teach pendant 85. This pendant permits manual operation of manipulator 1 and the storage of location and function data in data store 50. As with other data input/output devices, data is transferred to and from pendant 85 through the serial channel interface 82 to local bus 72 and therefrom through the dual port device 71 to the system bus 43. As the teach mode of operation does not form a part of the present invention, further details thereof shall not be given herein. Additional details of the operation of the manipulator in the teach mode may be found in U.S. Pat. No. 3,920,972.

Since it is an object of the auto mode programs 48 to control the motion of the manipulator members to produce motion of the tool center point 19 along a straight line path between programmed locations, a schematic representation of the manipulator can be useful in describing the auto mode control algorithms. Such a schematic representation is depicted in FIG. 3.

In FIG. 3 a first line segment 87 is shown corresponding to the manipulator upper arm 4 of FIG. 1. A second line segment 88 is shown corresponding to the manipulator forearm 6 of FIG. 1. The shoulder axis 17, elbow axis 18, wrist 8 and the tool center point 19 of FIG. 1 are also indicated in FIG. 3. The wrist 8 and tool center point 19 are shown joined by line segment 89.

The line segments 87, 88, and 89 of FIG. 3 are dimensioned respectively with lengths L1, L2, and L3. Length L1 represents the length of the upper arm 4 between shoulder axis 17 and elbow axis 18. The length L2 represents the length of forearm 6 from the elbow axis 18 to the center of wrist 8. Finally, length L3 represents the distance between the center of wrist 8 and the center point 19 of tool 14.

In FIG. 3, the line segments 87, 88, and 89 are shown in relation to the rectangular coordinate system X, Y, Z of the manipulator 1. The manipulator coordinate system is frequently referred to as the manipulator "world" coordinate system. The origin of this coordinate system corresponds to a point on the manipulator 1 located at the intersection of vertical base axis 16 and horizontal shoulder axis 17. It will be noted from FIG. 3 that the vertical Z axis of the manipulator coordinate system is coaxial with base axis 16. When the manipulator 1 is in its "home" position, the horizontal Y axis is coaxial with shoulder axis 17 and the horizontal X axis is perpendicular to and passes through the intersection of base axis 16 and shoulder axis 17.

A second coordinate system is used in association with the manipulator. This coordinate system, x, y, and z, has its origin at the center point of wrist 8. The center point of wrist 8 is defined as the intersection of its three axes of rotation. This second coordinate system is frequently referred to as the "hand" coordinate system. The line segment 89 of FIG. 3, representing the distance between the center point of wrist 8 and the center point 19 of tool 14 comprises a vector in the hand coordinate system.

At any given instant in time the three orientation angles define the orientation of the hand axis system x, y, z to the manipulator axis system X, Y, Z. As a consequence, and as is known in the art, transformations from the manipulator coordinate system to the hand coordinate system and from the hand coordinate system to the manipulator coordinate system can be performed and stated as follows:

| X | | x |
|---|---|---|
| Y | = [Q] | y |
| Z | | z |
| manipulator | | hand |
| x | | X |
| y | = $[Q]^{-1}$ | Y |
| z | | Z |
| hand | | manipulator |

Where [Q] represents an appropriate transformation matrix.

Returning to FIG. 3, rotation of the manipulator about its base axis 16 is dimensioned by the magnitude of angle a. Rotation of the manipulator upper arm is dimensioned by the magnitude of angle b. Rotation of the manipulator forearm is dimensioned by the magnitude of angle c. It will be noted that angle c is measured from the center line of the manipulator upper arm. It will be appreciated by those skilled in the art with reference to FIG. 3 that the lengths L1 and L2 and the magnitudes of angles a, b, and c completely define the location of the center point of wrist 8. If line segment 89 were coaxial with line segment 88, then lengths L1, L2, and L3 together with the magnitudes of angles a, b, and c would completely define the location of the tool center point 19.

The introduction of rotation at the axes of wrist provides for orientation of a function element associated with tool 14 through the tool center point 19. The wrist 8 is shown enlarged in FIG. 4. As indicated above, the wrist comprises first segment 9 with its integral shaft 10 by which the wrist 8 is attached to the manipulator forearm 6. The wrist further comprises second segment 11 and its integral shaft 12, which supports face plate 13. The first axis of rotation 90 of wrist 8 is defined by rotation of wrist segment 9. The second axis of rotation of wrist 8 is defined by rotation of wrist segment 11. This axis is indicated at 91 and is perpendicular to the abutting faces of wrist segments 9 and 11. The third axis of rotation of wrist 8 is defined by rotation of face plate 13. This axis is indicated at 92 and is perpendicular to face plate 13. Rotation about wrist axis 90 is designated $\rho 1$. Rotation about wrist axis 91 is designated $\rho 2$. Finally, rotation of face plate 13 is designated by $\rho 3$.

FIG. 5 illustrates how the orientation angles are defined with respect to the hand coordinate system, having its origin at the center of wrist 8. The axes of the hand coordinate system (x, y, z) would be parallel to the X, Y, and Z axes, respectively, of the manipulator (world) coordinate system when the orientation angles are zero (0). The orientation angles D, E, and R define rotations relative to the hand coordinate system as follows:

(1) E is the magnitude of a rotation about z to align x and y with $x_1$ and $y_1$, respectively;

(2) D is the magnitude of a rotation about $y_1$ to align $x_1$ with $x_2$ and z with $z_2$; and (3) R is the magnitude of a rotation about $x_2$ to align $y_1$ with $y_3$ and $z_2$ with $z_3$.

It will now be appreciated by one skilled in the art that, when the lengths L1, L2, and L3 are known, the position of tool center point 19 can be completely defined in terms of the three translation values X, Y, and Z and the three orientation angles D, E, and R.

In the control system of the present invention, when a path is being computed in the auto mode, or the manipulator 1 is being taught in the teach mode, the manipulator (world) coordinate system, X, Y, Z, D, E, R is used. Signals to the servo system of the present invention must be in terms of joint angle positions (i.e., motor positions), frequently termed "joint space". As a result, these signals are in terms of a, b, c, $\rho 1$, $\rho 2$, $\rho 3$. As is known in the art, there are matrix transformation operations for transformations between X, Y, Z, D, E, R and a, b, c, $\rho 1$, $\rho 2$, $\rho 3$.

Reference is now made to the geometric schematic representation of FIG. 6. In this figure, the straight line segment 93 represents the path of motion along which the tool center point 19 is to proceed in traveling from point $P_0$ to $P_1$ defined by stored input signals. The manipulator control in auto mode interpolates intermediate points $P_i$ along this straight line path, effecting the path motion in incremental intervals $\Delta T$. The coordinates of points $P_0$, $P_1$, and the intermediate points $P_i$ are all defined with respect to the manipulator (world) coordinate system. Assuming that the tool center point is to start from rest at point $P_0$ and to come to rest again at $P_1$, then the path control scheme provides automatic acceleration and deceleration to and from a programmed velocity. While the increments defined by the intermediate points $P_i$ are produced in accordance with a fixed increment interval period, the actual incremental distance between points $P_i$ varies as the velocity of the tool center point varies. Thus, the incremental distance $\Delta S$ which corresponds to the distance traversed during a constant incremental interval $\Delta T$ is seen to vary between the constant velocity portion of the motion and the acceleration and deceleration phases of the prescribed motion.

In the practice of the present invention, $\Delta T$ is equal to 15 milliseconds. Thus, the servo input/output board 51 receives position commands from cycle control board 23 every 15 milliseconds, and the cycle control board 23 is calculating fast enough to provide these signals. The cycle control 23 computes how far the tool center point can move along line $P_0$, $P_1$ based on acceleration, deceleration, programmed velocity, and the like, and provides the servo input/output board 51 with appropriate joint space signals to accomplish this.

Figures 7, 8:
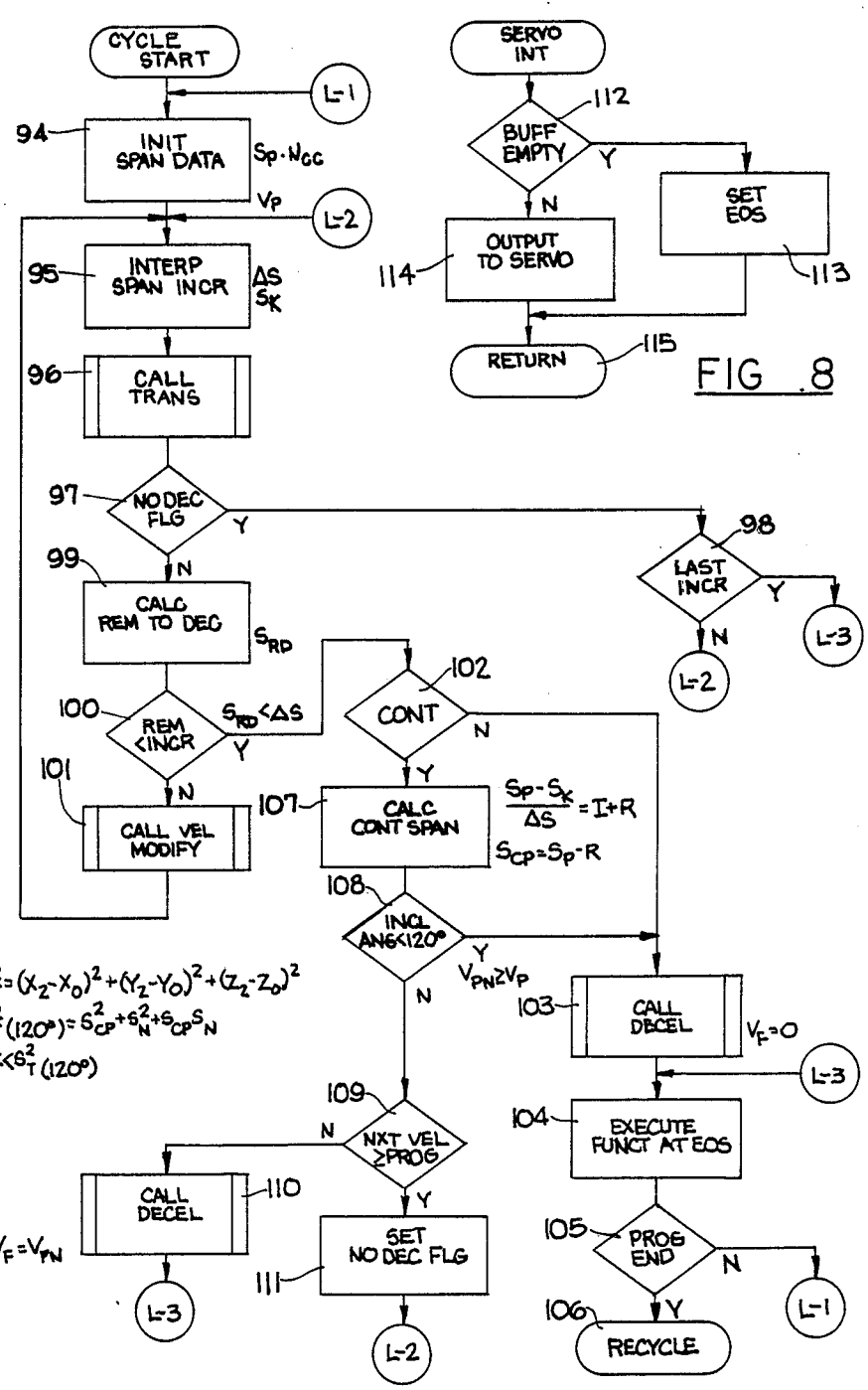
FIGS. 7 and 8 are flow charts of the two principal control procedures effecting motion control.
Figure 9:
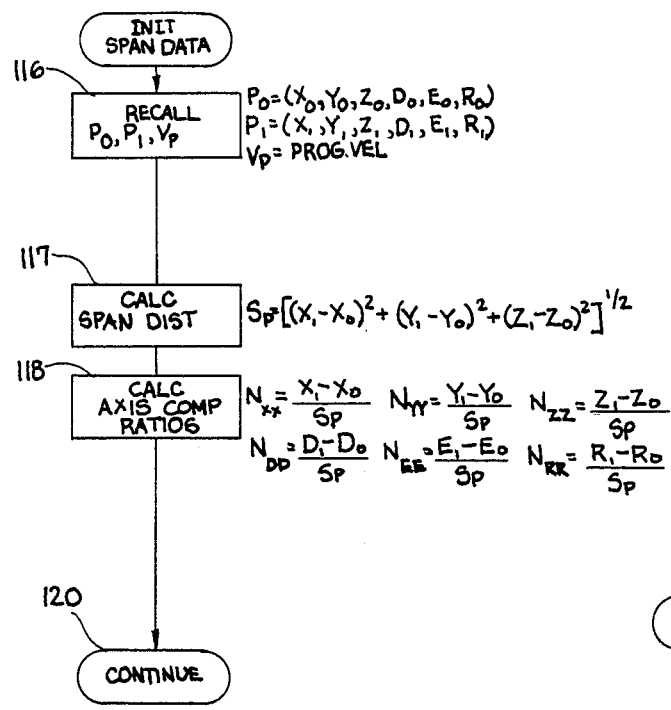
FIGS. 9-13 are flow charts of subroutines and major segments of the flow chart of FIG. 7.

The overall cycle of operation of the manipulator 1 in the automatic mode is illustrated by the flow chart of FIG. 7. At process step 94, the control initializes the span data required to interpolate the motions between the programmed points $P_0$ and $P_1$ at the programmed velocity $V_p$. Values for the programmed span length $S_p$, and the coordinate component ratios $N_{cc}$ are produced by the procedure associated with step 94. At process step 95, an increment along the path is interpolated to produce the incremental distance $\Delta S$ and the accumulated incremental distance $S_k$. Process step 96 calls the subroutine to effect a transformation of the interpolated intermediate point from manipulator coordinates to joint angle positions. The subroutine associated with process step 96 produces the axis command signals and stores these signals in a buffer for access by the servo supervisor on the occurance of the servo interrupt signal. Following the execution of the subroutine of process step 96, a test is made at decision step 97 to determine whether or not a flag indicating that no deceleration is required as been set. If the no deceleration flag has been set the process continues at decision step 102 where it is determined whether or not the present increment being interpolated is the last increment of the current linear span between programmed locations. If not, another increment is interpolated through the connector L-2. If the current increment is the last increment of the span, the process continues through connector L-3 to process step 104 where the function associated with the end of span is executed. Thereafter, decision step 105 determines whether or not the present location is the last location of the program. If not, further programmed location data will be processed by proceeding through connector L-1. If it is the last, the entire programmed cycle of operation will be re-executed as indicated by terminal 106.

Returning to decision step 97, had it been determined that the no deceleration flag was not set, then the execution of the procedure continues at process step 99. This step calculates the distance remaining $S_{RD}$ in the current span prior to the point at which a deceleration to stop must begin. At decision step 100, the magnitude of the remaining distance $S_{RD}$ is tested against the current incremental distance $\Delta S$ to determine whether or not the remaining distance $S_{RD}$ is less than the current incremental distance $\Delta S$. If the remaining distance is not less than the current incremental distance, the process continues at step 101 where execution of a velocity modification subroutine is intiated by a subroutine call. A velocity modification subroutine may respond to any process parameter to produce a change in the incremental velocity to adapt the tool center point velocity to process changes or to constrain manipulator axis velocities to their associated limits. Upon completion of this subroutine, the procedure continues through the loop at process step 95 where the span increment is interpolated using the most recently created value of incremental velocity.

Returning to decision step 100, had it been determined that the distance remaining $S_{RD}$ was less than the incremental distance $\Delta S$, then execution of the procedure would continue at decision step 102. This step determines whether or not motion is to continue through the programmed location defining the end of the current linear span. If the tool center point is to come to rest at the end of the current span, then decision step 102 will determine that the programmed location is not a continue point, and the execution of the procedure will continue at process step 103 where execution of the deceleration subroutine is initiated by the call setting the final velocity parameter signal $V_f$ equal to zero. Upon completion of the execution of the deceleration subroutine, execution of the overall procedure continues at process step 104 where the function command associated with the end of the current span will be executed. Thereafter, at decision step 105, it is determined whether the present programmed location is the last programmed location of the program. If it is, program execution is resumed by beginning at the first location of the stored program through the terminal 106 indicating that the program should be recycled. If the present location is not the last location of the stored program, execution proceeds through the connector L-1 to interpolate the next programmed linear span.

Referring again to decision step 102, if it had been determined that the programmed location for the end of the current span is one through which motion of the tool center point is to continue, execution of the overall cycle control procedure advances to process step 107 where a new end position for the current span is computed. Because the interpolated intermediate positions are spaced apart by an incremental distance defined by the incremental interval period and the effective increment velocity, it is anticipated that when motion is to continue through a programmed position the distance remaining in the span from the deceleration decision position to the programmed end position will not always equal an integral multiple of the current incremental distance. To account for this discrepancy, the current span is effectively terminated at the integral multiple of the current incremental distance nearest the programmed end position. To accomplish this, the distance remaining $S_p - S_k$ is divided by the incremental distance $\Delta S$ to produce the interger multiple and remainder. The current span length is then reduced by the remainder to produce the continue span length $S_{CP}$. This distance then redefines the end position of the current span and the start position of the next span.

At decision step 108, it is determined whether the angle included between the current span and the next span is less than 120°. If the included angle is less than 120° the motion of the tool center point will be terminated at the final location $P_1$ of the current span. The determination of the value of the included angle relies upon the rule of cosines. Two values for the span distance between the programmed location at the beginning of the present span and the programmed location at the completion of the next span are produced independently. That is, the span length $S_T^2$ is computed as the sum of the squares of the rectangular coordinate components while the value $S_T^2$ (120°) is computed as the sum of the square of the span length $S_{CP}$ computed in process step 107, the square of the span length $S_n$ of the next span, and the product of the next span length $S_n$ and the span length of the present span $S_{CP}$. If $S_T^2$ is less than $S_T^2$ (120°), then the included angle is less than 120°.

If the included angle is less than 120°, then it is necessary to bring the motion to a halt before proceeding and the process would again continue through the call to the deceleration procedure at process step 103. If the included angle is 120° or greater, then the process continues at decision step 109. Decision step 109 determines whether or not the program velocity of the next span is greater than or equal to the current programmed velocity. If the programmed velocity of the next span is less than the programmed velocity of the current span, then it is necessary to effect a deceleration in the current span so that the motion in the next span will be started at the velocity programmed for that span. Following the deceleration procedure called by process step 110, the overall cycle is continued at process step 104 through connector L-3. If the programmed velocity for the next span is in fact greater than or equal to the programmed velocity of the current span, then the process from decision step 109 continues at the process step 111 which sets the no deceleration flag. Thereafter, the overall cycle of operation previously described is resumed through the connector L-2.

It will now be apparent that the overall cycle control comprises the repeated execution of the stored program. Motion between programmed locations involves the iterative production of incremental moves along the straight line path therebetween. The overall cycle comprises manipulator motion and the execution of programmed functions associated with the programmed locations.

Referring to FIG. 8, the servo interrupt service routine executed by the servo control begins at decision step 112, where it is determined whether or not the buffer in which axis command signals are temporarily stored is empty. If the buffer is empty it is assumed that the cycle control has reached the end of span and an end of span signal is sent at process step 113. If the buffer is found not to be empty by decision step 112, then the axis motion increments represented by the axis command signals are retrieved from the buffer at step 114. At terminal 115 the servo interrupt routine is ended and execution of the overall cycle of operation by the cycle control 23 resumes. As was previously stated, the servo supervisor divides the increments, represented by the axis command signals, into subincrements which are used to command servo position during predetermined subintervals of the iteration interval. The process of division and output of the servo command signals continues concurrently with the execution of the overall automatic mode procedure by the cycle control 23.

The description of the major segments and subroutines associated with the flow chart of FIG. 7 will be described with respect to FIGS. 9-14. The flow chart of FIG. 9 corresponds to the process step 94 of FIG. 7. At process step 116, programmed span data corresponding to preprogrammed input signals is recalled from data store 50 of memory 46. The start point $P_0$, end point $P_1$ and programmed velocity $V_P$ define the motion to be next executed by tool center point 19. The programmed coordinate data recalled from memory are shown subscripted in correspondence with the programmed point designation. At process step 117, the total span length is computed using the rectangular coordinates of the two programmed points and extracting the square root of the sum of the squares of the coordinate components. At process step 118, the in-axis component ratios of the programmed coordinate system are computed by dividing the coordinate components by the span length. These ratios are designated $N_{XX}$, $N_{YY}$, $N_{ZZ}$, $N_{DD}$, $N_{EE}$, and $N_{RR}$. Axis component ratios for the orientation angles are computed in the same way as the component ratios for the rectangular coordinate axes. Once this preliminary computation of span variables is completed, the overall cycle of operation continues through the terminal 120 to the process block 95 of FIG. 7.

Figure 10:
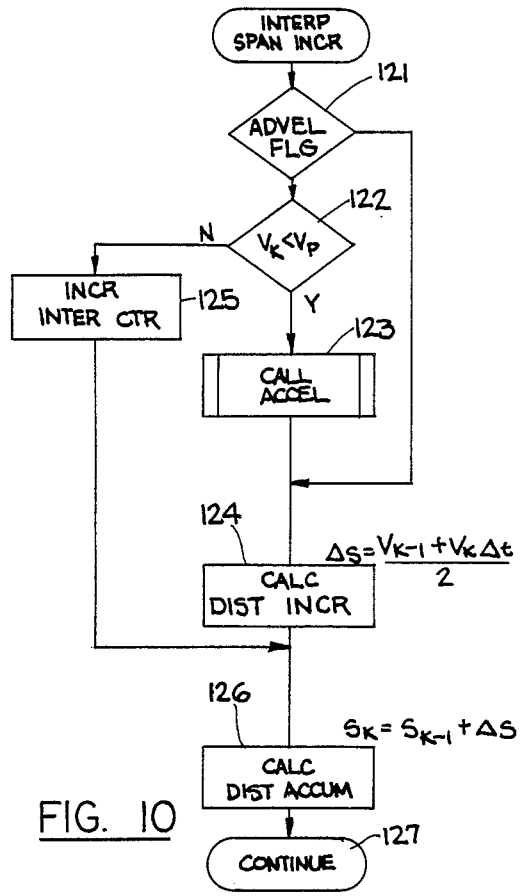

Referring now to FIG. 10, the process step of interpolation of a span increment corresponding to block 95 of FIG. 7 is expanded into a more detailed flow chart. Beginning at decision step 121, the determination is made whether or not an adaptive or nonprogrammed velocity flag has been set by the subroutine called by process step 101 of FIG. 7. If there is no adaptive velocity function programmed for the current span, or if the adaptive velocity function has not resulted in a change to the incremental velocity value, then the adaptive velocity flag will not be set and the process will continue at decision step 122. Decision step 122 tests the value of the current incremental velocity signal $V_K$, that is, the incremental velocity of the current iteration K, against the value of the programmed velocity signal $V_P$ to determine whether or not the current incremental velocity is less than the programmed velocity. If so, the process continues at process step 123 which calls the acceleration subroutine.

The effect of the acceleration subroutine is to produce a new value for the incremental velocity in accordance with a predetermined function of acceleration and produce a corresponding distance increment $\Delta S$. Thus, at the beginning of a move where the tool center point starts from rest, the initial value of the incremental velocity shall be zero, the programmed velocity will, of course, be a non-zero value, and the call to the acceleration subroutine at process step 123 begins the change of the incremental velocity values $V_k$ and produces an incremental distance signal $\Delta S$. When the incremental velocity $V_K$ is not less than the programmed velocity $V_P$, it is not necessary to calculate a new value for the incremental distance signal, and it is only necessary to increment the iteration counter as indicated by process step 125. In either event, the process ultimately resumes at process step 126 where the value of the accumulated increment signal $S_K$ is calculated in accordance with the equation set forth to the right of process step 126. The overall cycle of operation is then continued by the continue of flow chart terminal 127. At this point, the overall cycle of operation continues by the call of process step 96 of FIG. 7, calling the transform subroutine illustrated in the flow chart of FIG. 11.

Figure 11:
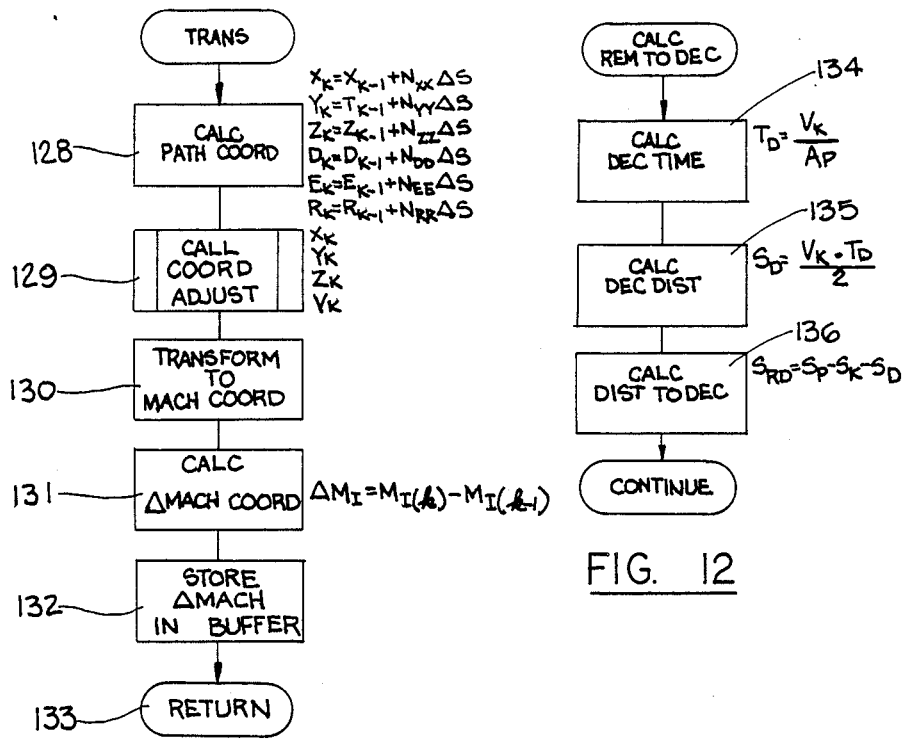

Referring to FIG. 11, at process step 128, the values of the end point coordinate signals representing coordinates in the manipulator coordinate system of the accumulated interpolation distance are calculated. This is accomplished by summing the in-axis components of the interpolated incremental distance represented by the increment distance signal $\Delta S$ with the previous values of the end point coordinate signals subscripted K-1. At this point step 129 calls the coordinate adjust routine to be described hereinafter. This routine will supply adjusted coordinates if required, for example, to follow a seam. This routine also limits the magnitude of the deviation off the programmed path in accordance with a user specified parameter. Thereafter, the coordinates with reference to the program coordinate system of the interpolated point are transformed to joint angle positions a, b, c, $\rho 1$, $\rho 2$, $\rho 3$ by step 130. To avoid inverse trigonometric functions, an iterative approximation algorithm is used that produces an error function based on the current joint angle positions. Details of this approach are shown in U.S. Pat. No. 3,909,600, which to the extent necessary for describing this transformation algorithm is hereby incorporated herein by reference. At process step 131, the change in the joint angle positions is calculated and at the process step 132, the incremental difference of the joint angle positions are stored in the buffer for access by the servo interrupt service routine. When the transformation routine is completed, the processing of the overall cycle of operation is resumed by the return through the terminal 133. This, then, brings the process to decision step 97 of FIG. 7. Following step 97, the overall cycle continues at process step 99 where the remaining distance to the beginning of the deceleration span is calculated and the detailed flow chart of this process step is shown in FIG. 12.

Figure 12:
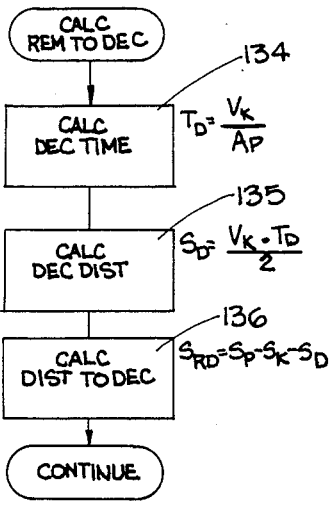

Referring to FIG. 12, process step 134 calculates the period required to decelerate using a predetermined value of acceleration. Thus, the approximate time required to decelerate to stop is equal to the quotient of the current incremental velocity $V_K$ and this constant of acceleration. At process step 135, a value of a deceleration distance signal representing the distance required to decelerate is calculated assuming that an average velocity equal to half the current incremental velocity would be in effect during the interval calculated in process step 134. Finally, at process step 136, a value of a span remainder signal $S_{RD}$ is calculated representing the remaining distance within the programmed span length from the current interpolated position to the point at which the just calculated deceleration distance must begin. Thus, the distance remaining $S_{RD}$ is equal to the programmed span length $S_P$ less the portion of the span represented by the accumulated interpolated distance $S_K$ and the portion of the span necessary to decelerate $S_D$. Following this calculation, the overall cycle of operation continues at decision step 100 of FIG. 7 wherein it is determined whether or not the remaining distance $S_{RD}$ is less than the current effective incremental distance $\Delta S$. If the remaining distance $S_{RD}$ is not less than the current effective incremental distance $\Delta S$, then another increment of that distance can be interpolated. If, however, the current effective incremental distance $\Delta S$ is greater than the calculated remaining distance $S_{RD}$, it is necessary to immediately begin deceleration.

Figure 13:
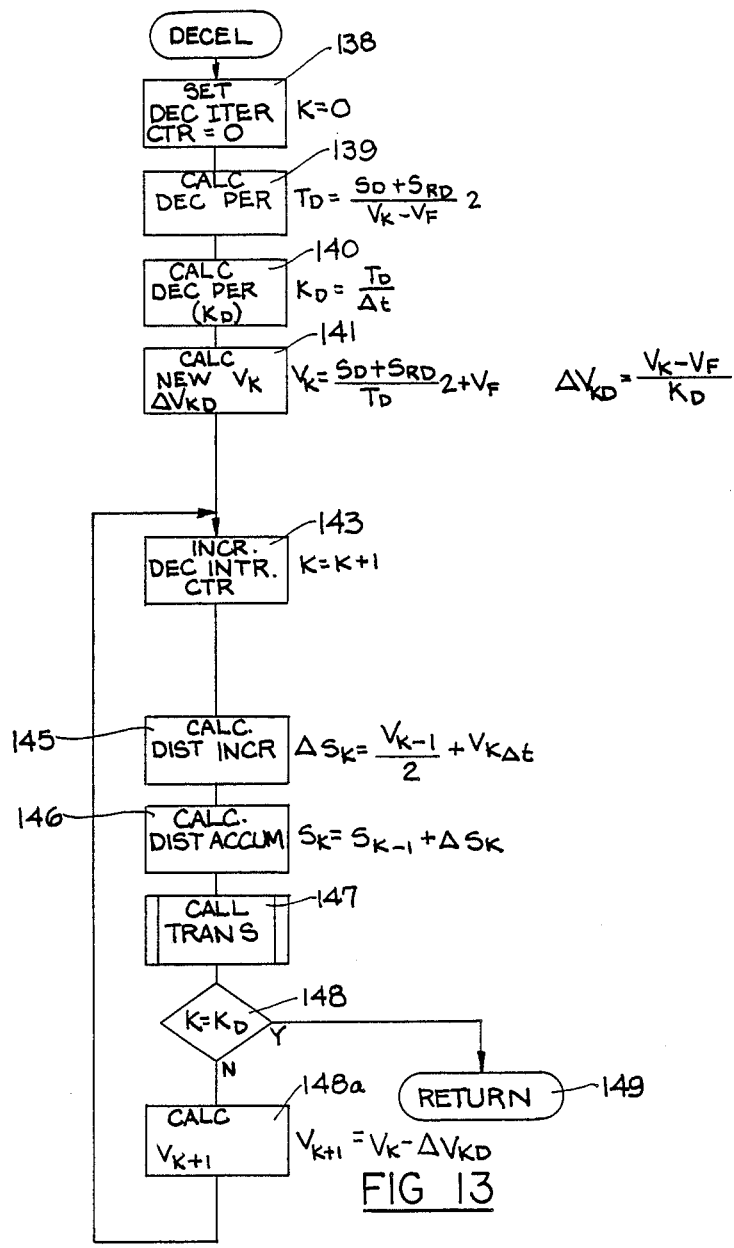

The deceleration subroutine is illustrated in the flow chart of FIG. 13.

The deceleration subroutine iteratively produces decreasing values of the incremental velocity variable $V_K$ in accordance with a predetermined function of acceleration. At the start of the acceleration subroutine, the incremental velocity is recomputed to adjust for round-off errors of the interger arithmetic executed by the computer used by applicants. Referring now to FIG. 13, process step 138 sets the deceleration iteration counter equal to zero. At process step 139 the period of deceleration $T_D$ is calculated as two times the quotient of the as yet unexecuted span length and the change in velocity between the current incremental velocity $V_K$ value and the final velocity $V_F$ at which the current span is to finish The final velocity $V_F$ is zero in all cases except when the next programmed position is a continue point and the included angle between the current span and the next span is equal to or greater than 120°. At process step 140, the number of iterations $K_D$ required to effect the deceleration is computed as the quotient of the calculated period of deceleration $T_D$ and the predefined increment interval $\Delta t$. At process step 141, a new value for the incremental velocity $V_K$ is calculated as the sum of the final velocity $V_F$ and two times the quotient of the remaining distance of the current span and the calculated period for deceleration $T_D$. As was previously stated, this recalculation of the incremental velocity $V_K$ is necessitated by the use of interger arithmetic in applicant's digital computer. Also at process step 141 an incremental change in velocity signal $\Delta V_{KD}$ is computed. This signal determines the change of magnitude of velocity for each iteration of the deceleration subroutine. The incremental change of velocity signal is calculated by dividing the velocity difference between the initial and final velocities by the number of deceleration iteration $K_D$. At process step 143, the deceleration iteration counter is incremented. At process step 145, the incremental distance $\Delta S$ is calculated as the product of the average incremental velocities of the current and previous increments and the incremental interval signal $\Delta t$. At process step 146, the accumulated interpolated distance $S_K$ is calculated as the sum of the previous interpolated distance and the incremental distance $\Delta S$. At process step 147, the transformation subroutine is called and at decision step 148 the iteration counter is tested for equality with the previously calculated deceleration iteration value. If they are equal, the deceleration subroutine is complete and the overall cycle of operation is resumed by the return of the terminal 149. However, if the iteration counter is not equal to the deceleration iteration value, then a new increment velocity $V_{KH}$ is calculated at process step 148a as the difference between the current increment velocity $V_K$ and the change in velocity $V_{KD}$. Thereafter, the deceleration iterative loop is repeated by the return line bringing processing back to process step 143.

The manipulator 1, its control 20, and its basic mode of operation having been described, reference is again made to FIG. 1, and in particular to the vision system 15, 25, and 26. Applicants have chosen to use the commercially available vision system produced by Optische Industrie De Oude Delft of Delft, Holland, under the mark SEAMPILOT. It will be understood by those skilled in the art that any appropriate vision system can be used, capable of scanning a seam and providing vision data processor 24 (see FIG. 2) with points along the seam in camera coordinates.

As is known, the laser scanner/camera head 15 contains a laser focused onto a servo controlled mirror, generating a side-to-side scanning motion of the laser beam. The camera portion of the laser scanner/camera head 15 views the location where the laser beam strikes the workpiece. The laser scanner/camera head 15 is provided with appropriate coolant means, shielding gas for protection of the disposable optical windows, and the like, all as is known in the art.

The camera control unit 25 turns the laser on and off, controls the scanning of the laser beam, and transmits the appropriate camera data to the signal processing computer 26. The signal processing computer 26 compares each contour profile of the workpiece obtained by the scanning laser to a specification of the profile (a template) selected by the manipulator operator from vision data processor memory 42 (see FIG. 2). If the selected profile is found, the location of points of interest (the center of the seam) on the profile are computed by the signal processing computer 26 in camera coordinates. The camera coordinates are transmitted to the vision data processor 24 (see FIG. 2) through serial channel interface 82, local bus 72, dual port 71, and system bus 43. As will be apparent hereinafter, the vision system position values are used to offset the manipulator's programmed path in order to guide the tool 14 through a desired contour. This information can also be used to adjust for part placement errors, variations in manufacturing tolerances, heat distortions of the part, irregular seam geometries and the like. While tracking, the manipulator's position is modified to keep the tool 14 in the seam. The manipulator's orientation values may be programmed as required by the weld process, without degrading tracking performance. This capability allows the welding of many parts which could not be performed if the orientation angles had to remain fixed.

It is necessary that the location and orientation of the camera head of element 15 (see FIG. 1), relative to the hand coordinate system, be determined so that a transformation matrix can be formed to relate camera coordinates to manipulator (world) coordinates. We have already discussed transformation of hand coordinates to manipulator coordinates (world coordinates).

To determine the camera location in hand coordinates, camera coordinates of a known target location are determined and stored in the teach mode of operation using a calibration fixture secured within the manipulator's working volume. The manipulator (world) coordinates of the calibration fixture are obtained from the manipulator by touching the calibration fixture with the manipulator's end effector (i.e., tool center 19). The same calibration fixture target point is then viewed by the camera from three different locations. For each location the camera coordinates of the fixture target and the manipulator (world) coordinates of the tool center point are stored. Vectors from each location to the fixture target are calculated and transformed to hand coordinates by:

$$\begin{pmatrix} x \\ y \\ z \end{pmatrix}_{hand} = [Q]^{-1} \begin{pmatrix} X \\ Y \\ Z \end{pmatrix}_{manipulator}$$

With three sets of hand coordinate values for the target point and three corresponding sets of camera coordinates for the target point, a resulting camera coordinate system-to-hand coordinate system transformation matrix can be generated. The three sets of coordinates are used to form a first $4 \times 4$ matrix including the camera coordinates and the coordinate components of the unit vector normal to the plane defined by the three locations from which the views were taken. A second $4 \times 4$ matrix is formed including the hand coordinates of the three locations and the unit vector normal to the plane defined by the three locations. A transformation matrix for transforming camera coordinates to hand coordinates is then formed as the product of the inverse of the first $4 \times 4$ matrix and the second $4 \times 4$ matrix. The resultant transformation matrix [M] operates as follows:

$$\begin{pmatrix} x_{SH} \\ y_{SH} \\ z_{SH} \end{pmatrix}_{hand} = [M] \begin{pmatrix} x_{SC} \\ y_{SC} \\ z_{SC} \end{pmatrix}_{camera}$$

$$\begin{pmatrix} x_{SC} \\ y_{SC} \\ z_{SC} \end{pmatrix}_{camera} = [M]^{-1} \begin{pmatrix} x_{SH} \\ y_{SH} \\ z_{SH} \end{pmatrix}_{hand}$$

Unlike the [Q] matrix, the [M] matrix may be considered a constant since the relationship between the camera coordinates and the hand coordinates does not change unless the camera is bumped or the like. The relationship between the hand coordinates and the manipulator (world) coordinates will change as a function of the different orientation angles desired.

As indicated above, the vision system signal processing computer feeds camera coordinate data to vision data processor 24. The vision data processor 24 converts the camera coordinate data to manipulator (world) coordinate data. This may be indicated as follows $$\begin{pmatrix} X_S \\ Y_S \\ Z_S \end{pmatrix}_{manipulator} = [Q][M] \begin{pmatrix} x_{SC} \\ y_{SC} \\ z_{SC} \end{pmatrix}_{camera}$$

Specifically, the camera data is transformed through the [M]matrix which transforms it from camera coordinates to hand coordinates. Thereafter, by supplying the orientation values that were in effect at the time the camera scan was taken a [Q]matrix can be formed. The hand coordinates are fed through the [Q]matrix and manipulator (world) coordinates result.

In the practice of the present invention, the laser scan/camera head 15 previews a seam ahead of the tool or weld torch 14. The seam profile is processed and its location is stored. At a later time, this seam data is used to guide tool center point 19 so that it passes directly through the tracking point. This is implemented by providing a FIFO buffer for the desired tracking points. The FIFO is written to by that routine of vision data processor 24 which accepts seam data and computes the track point in manipulator (world) coordinates. The FIFO is read by the algorithm which calls for the next point and then heads toward it. The FIFO constitutes a part of the vision data processor memory 42.

Figure 14:
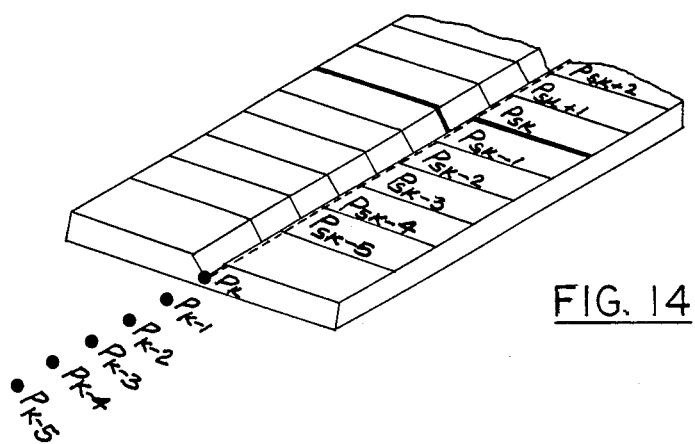
FIG. 14 is a diagrammatic representation of the laser scanner/camera head tracking procedure.

FIG. 14 illustrates this type of tracking. In FIG. 14, the tool center point 19 is to be considered to be located at position $P_K$. At this same instant, the laser scanner/camera head is performing a preview scan, shown ahead of the tool center point at a position $P_{SK}$. However, the tool center point is tracking to the tracking point specified during scan $P_{SK-5}$, which is five scans behind the current one. Thus, the FIFO would have to be at least six elements long to perform this weld. When tool center point reaches position $P_{SK-5}$, the laser scanner/camera head begins scan $P_{SK+1}$. It is therefore obvious that two routines must be provided in the vision data processor for proper seam tracking operation. First, the seam processing routine accepts data from the vision system; determines the tracking point; transforms the tracking point from camera coordinates to manipulator (world) coordinates and then stores the X, Y, and Z world coordinates of the seam point in the FIFO. The seam tracking routine determines the current robot position and the current seam point FIFO entry; offsets the manipulator's path to head toward this desired point; and when this point has been reached selects a new seam point from the FIFO. Thus, the seam processing routine is responsible for the transformation of the seam data as received from the laser scanner/camera head into manipulator (world) coordinates, and placing these results in the FIFO. The seam tracking routine is responsible for removing FIFO entries at some later time, and then altering the robots path to pass through them.

It will be appreciated from FIG. 14 that the distance between the laser scanner/camera head 15 and the tool center 19 has a significant effect on the size of the FIFO. Similarly, the velocity of tool center point 19 affects the FIFO size, slower speeds causing more spans to be taken over the given preview distance. In addition, if measurements are taken too close together, the inaccuracies of the measuring system becomes as large as the actual distance being measured.

To keep the FIFO size within practical limits, it is necessary to devise a method which will selectively discard certain scans, so that the FIFO is never filled to overflowing.

To implement FIFO compression when tracking, the distance between the tool center point 19 and the center of the field of view is computed. Since a point within the field of view can be offset a maximum of about two inches from the field of view center, a two inch offset is added to this distance to obtain a worst-case distance. Thereafter, the total is divided by a number of FIFO entries (say 35) to obtain a tracking distance $S_{TF}$ which defines the minimum separation between seam points that will be loaded in the FIFO. A seam point sensed by the camera which is not more than the tracking distance from the last FIFO entry is not loaded into the FIFO.

The FIFO is loaded for the tracking algorithm by acquiring seam points and storing them in the FIFO. The acquisition begins in the searching mode and assumes no seam has yet been found. The process waits for the vision system signal processing computer 26 to send a data message, and reviews it to see if a seam has been found and matched to the operator selected template. Each tracking point to be loaded in the FIFO is transformed from camera coordinates to hand coordinates using the [M]matrix. Since this data is from a scan which began about 450 milliseconds ago, it is associated with the manipulator coordinates which were valid some 30 updates ago. By forming the [Q]matrix from the old D, E, R values, the location of the tracking point can be found in manipulator (world) coordinates. The point is then compared to the last point in the queue, and pushed into the FIFO if it exceeds the minimum distance required (i.e., the FIFO tracking distance). If the seam is found for three consecutive scans, the seam start is assumed to be valid. In addition, if the seam is lost afterwards for three consecutive scans, it is assumed that the seam is lost. It will be apparent that in both seam finding and seam tracking, the process functions are substantially the same. Data is received, transformed from camera to hand coordinates, converted to manipulator (world) coordinates, checked, and put in the FIFO if needed. An error will result if the process attempts to push a new seam point onto a completely filled FIFO.

Using the transformation and control techniques of the present invention for generating seam location data in world coordinates, together with the facility for recognition of the beginning or end of a particular seam, coordinate data may be created defining location of workpiece features with respect to which a particular manipulator program is to be executed. For example, the windshield opening of a vehicle body may be located by detecting the beginning or end of seams which have terminal locations in the windshield surround. The coordinates of these locations can then be used to define the necessary offsets, translations or rotations to correct the programmed coordinates for a windshield insertion routine to the actual location of the windshield opening.

Figure 15:
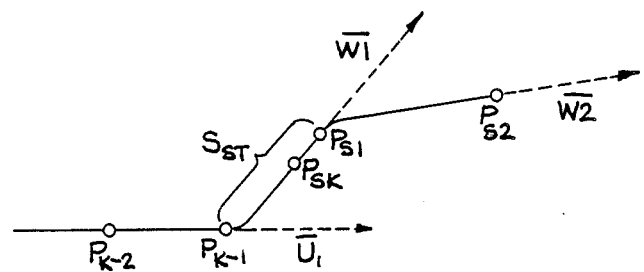
FIG. 15 is a diagrammatic representation of the corrections made in the programmed path of the tool center point in accordance with the vision seam tracking system of the present invention.

The actual tracking operation can be divided into two subprocesses. The first subprocess decides which point in the FIFO is the point to head towards and then adjusts the FIFO accordingly. If the distance from the tool center point to the first FIFO position is equal to or less than twice the incremental distance $\Delta S$, the first FIFO position is discarded and the next FIFO position is recalled or popped. When the appropriate FIFO point has been selected, the second subprocess performs the necessary calculations to move toward that position. This is illustrated in FIG. 15. In FIG. 15, the current tool center point is shown at $P_{K-1}$. The point $P_{S1}$ is the appropriate FIFO point found by the seam point acquisition process. By subtracting the last tool center point location $P_{K-2}$ from the current tool center point location $P_{K-1}$, the vector $\overline{U1}$ can be determined which indicates the current direction of travel. The vector $\overline{U1}$ may or may not be the programmed direction vector.

In any event, it will be noted that the target point $P_{S1}$ does not lie on vector $\overline{U1}$ with the result that the manipulator must change the direction of the tool center point. To do this, the vector $\overline{W1}$ from the current tool center point location $P_{K-1}$ toward the target point $P_{S1}$ is formed, and the target distance $S_T$ between points $P_{K-1}$ and $P_{S1}$ is calculated as shown in FIG. 15.

Since, as stated above, the target distance $S_T$ must be two or more times the incremental distance $\Delta S$, it is known that the tool center point cannot go from point $P_{K-1}$ to point $P_{S1}$ in a single iteration. As a consequence, the coordinates of the point $P_{SK}$ which will be reached by the tool center point in a single iteration distance $\Delta S$ along vector $\overline{W1}$ are calculated, as shown in FIG. 15. The manipulator then guides the tool center point to point $P_{SK}$.

If the remaining distance between point $P_{SK}$ and point $P_{S1}$ is still greater than twice the incremental distance $\Delta S$, the same calculations will be formed using point $P_{SK}$ as the current position of the tool center point and the point $P_{S1}$ as the target point. On the other hand, if the distance between points $P_{SK}$ and $P_{S1}$ does not exceed twice the incremental distance $\Delta S$, the point $P_{S1}$ will be discarded and a new target point $P_{S2}$ will be popped from the FIFO. The same calculations are then repeated to establish vector $\overline{W2}$ utilizing point $P_{S2}$ as the target point and point $P_{SK}$ as the current position of the tool center point.

Figure 16:
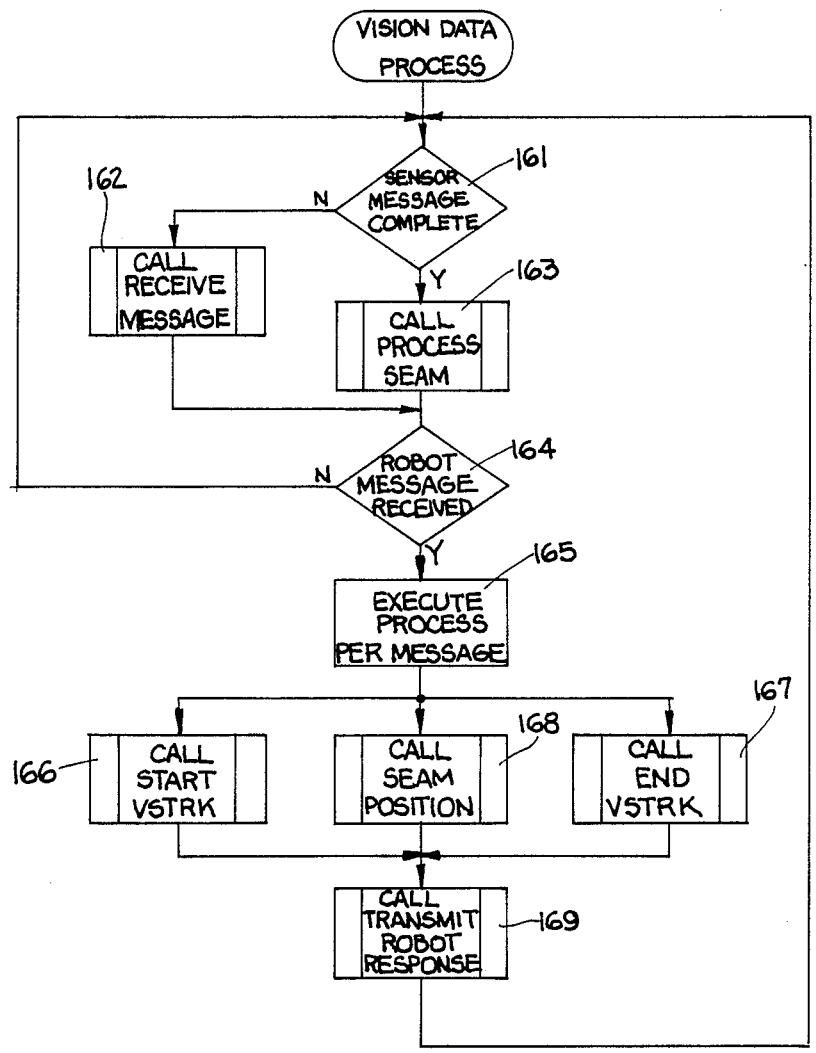
FIG. 16 is a flow chart illustrating the overall repetitive loop performed by the vision data processor.

Reference is now made to FIG. 16 which illustrates the overall repetitive loop performed by the vision data processor 24. At decision step 161, a check is made to see if the vision data processor 24 has received a complete message from the vision system signal processor computer 26. If a complete message has not been received, at process step 162, the vision data processor 24 will communicate with the vision system signal processing computer 26 using a standard data communication protocol.

If at decision step 161 it is determined that a complete message has been received from the vision system signal processing computer 26, the YES side will be followed to process step 163. Process step 163 calls the process seam subroutine to see if the seam coordinates from the vision system signal processing computer conform to the tracking FIFO distance and should be entered into the FIFO. Decision step 164 follows process steps 162 or 163 and determines whether the cycle control 23 has transferred a message to the vision data processor 24. If the answer is no, then the process steps just described are repeated. If the answer is yes, the vision data processor 24 will comply with the message from cycle control 23 at process step 165.

Depending upon the nature of the cycle control message at process step 165, the appropriate one of process steps 166, 167, and 168 will then be executed. At process step 166, an appropriate template will be provided to the signal processing computer by the vision data processor 24 and the tracking FIFO distance will be calculated.

If Process step 167 is executed, the vision data processor 24 will transmit an "OFF" signal to the vision system signal processing computer 26.

If process step 168 is executed, the appropriate FIFO entry will be selected and the next tool center point position $P_{SK}$ will be calculated and stored in a predetermined location for access by cycle control 23. At the termination of any one of process steps 166, 167, and 168, the vision data processor 24 will send an appropriate signal response to cycle control 23 at process step 169, depending upon which of the process steps 166, 167, and 168 had been performed. Following process step 169, the routine of FIG. 16 is repeated, completing the loop.

The subroutine associated with process step 162 of FIG. 16 is illustrated in FIG. 17. This is a simple subroutine consisting of only one process step 170 wherein the vision data processor 24 communicates with the vision system signal processing computer in accordance with the protocol DIN 66019, as is known in the art.

Figure 19:
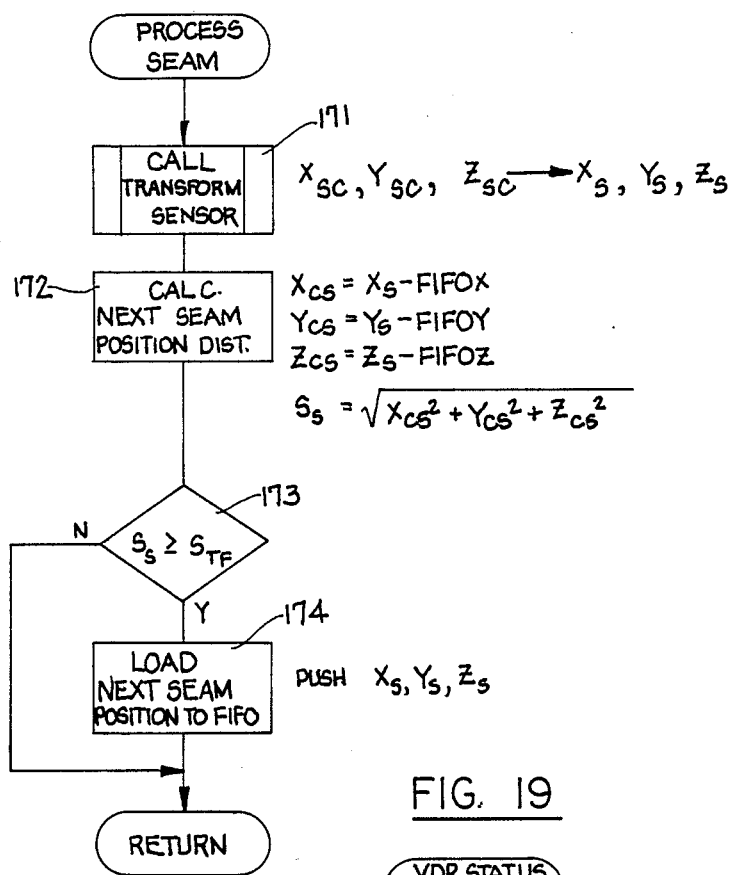
FIG. 19 is a flow chart illustrating the procedure for determining whether the most recently produced set of vision system seam coordinates are to be loaded into the FIFO.

The subroutine associated with process step 163 of FIG. 16 is illustrated in FIG. 19. In this subroutine, the first process step 171 requires the vision data processor 24 to transform the coordinates $X_{SC}$, $Y_{SC}$, and $Z_{SC}$, supplied by the sensor-camera of the vision system to the manipulator (world) coordinates $X_S$, $Y_S$, and $Z_S$. In process step 172 the coordinates $X_{CS}$, $Y_{CS}$, and $Z_{CS}$ of the vector from the last point loaded in the FIFO toward the vision system point $X_S$, $Y_S$, and $Z_S$ is calculated by subtracting the coordinates of the previous FIFO point FIFO X, FIFO Y, and FIFO Z from coordinates of the new vision system point $X_S$, $Y_S$, and $Z_S$. Thereafter, process step 172 calculates the magnitude of that vector, distance $S_S$, by taking the square root of the sum of the squares of vector coordinate components $X_{CS}$, $Y_{CS}$, and $Z_{CS}$.

At decision step 173 of FIG. 19, the scan distance $S_S$ is compared with predetermined tracking FIFO distance $S_{TF}$. If $S_S$ is not equal to or greater than $S_{TF}$, the subroutine of FIG. 19 returns to the routine of FIG. 16 just ahead of decision step 164 therein. If $S_S$ is equal to or greater than $S_{TF}$, the coordinates $X_S$, $Y_S$, and $Z_S$ of the point provided by the vision system are loaded or pushed into the FIFO in step 174. Following step 174, the subroutine of FIG. 19 terminates and returns to the routine of FIG. 16 just ahead of decision step 164.

The subroutine relating to process step 166 of FIG. 16 is illustrated in FIG. 18. The subroutine of FIG. 18 begins with process step 175 wherein a user selected template is transmitted to the vision system signal processing computer 26 by the vision data processor 24 from its memory 42. Process step 175 is followed by decision step 176 wherein it is determined whether or not the vision system is on. If the answer to this is yes, the YES bypass line brings the subroutine of FIG. 18 to an end and the process returns to the routine of FIG. 16 just ahead of process step 169. If at decision step 176 it is determined that the vision tracking system is not on, an "ON" signal is sent to the vision system signal processing computer 26 by the vision data processor 24 in step 177.

In step 178, the tracking FIFO distance $S_{TF}$ is calculated in the manner shown in FIG. 18 wherein $X_C$, $Y_C$, and $Z_C$ are the coordinates of the center of the field of view of the camera in the hand system and $X_T$, $Y_T$, and $Z_T$ are the tool center point coordinates in the hand system. The constant 4 represents the square of the two inch offset from the center of the field of view that a tracking point may lie on. The number 35 represents the number of FIFO positions. At the end of step 178 of FIG. 18, this particular subroutine is terminated and the process returns to the routine of FIG. 16 just ahead of process step 169.

The subroutine associated with process step 167 of FIG. 16 is illustrated in FIG. 20. Again, this is a simple subroutine containing only one process step 179. In process step 179, the vision data processor 24 transmits an "OFF" signal to the signal processing computer 26 of the vision system. This having been accomplished, the subroutine is terminated, returning the process to the routine of FIG. 16 just ahead of process step 169.

FIG. 21 illustrates the subroutine associated with process step 168. The subroutine of FIG. 21 has a first process step 180 wherein the tool center point velocity $V_K$ is recalled from the cycle control auto mode 48. This subroutine has a second process step 181 wherein it calls the calculate correction subroutine of FIG. 22. The subroutine of FIG. 22 begins with a decision step 182 where it is determined whether twice the incremental distance $\Delta S$ would be equal to or greater than the target distance $S_T$, i.e., the distance from the tool center point to the active seam point $P_S$. If the answer is no, the next two steps are skipped via the NO bypass line. If the answer is yes, then it is known that the FIFO entries under investigation are too close to the current location of the tool center point. A yes answer to decision step 182 leads to decision step 183 wherein the FIFO is checked to see if it is empty. If the FIFO is empty, the YES bypass line returns the process to the end of the subroutine of FIG. 21, which in turn returns the process to the routine of FIG. 16 just ahead of process step 169. Should this occur, process step 169 will inform cycle control 23 that there is no tracking data and the routine of FIG. 16 will loop to its beginning point. In the meantime, the manipulator will track the tool center point along the programmed path including any previously made offset correction.

Figure 22:
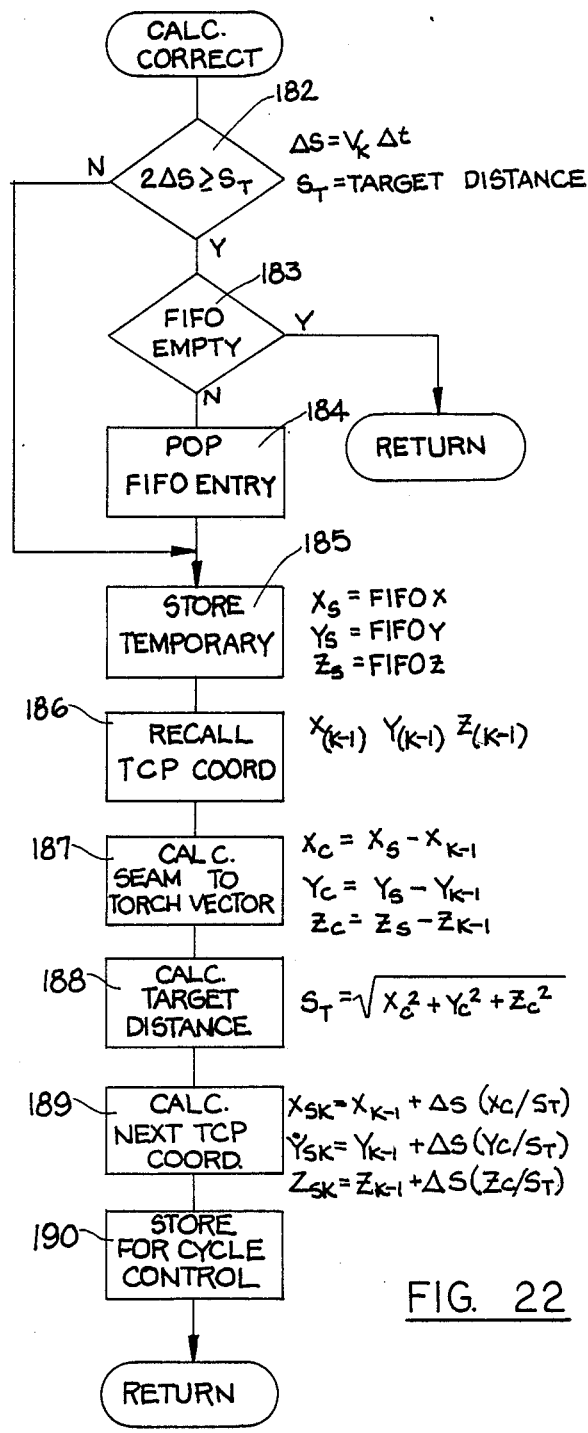
FIG. 22 is a flow chart of the detailed procedure for producing the intermediate point coordinates.

Returning to decision step 183 of FIG. 22, if it is found that the FIFO is not empty, the current FIFO coordinates under investigation will be discarded and the next set of FIFO coordinates will be popped for use.

The NO bypass line from decision step 182 and process step 184 both lead to process step 185. Here, the FIFO entry to be used is removed from the FIFO and is temporarily stored as the new target point coordinates $X_S$, $Y_S$, and $Z_S$. In process step 186, the coordinates to which the tool center point went last (i.e., the current position of the tool center point) are recalled.

In the next three process steps 187, 188, and 189, calculations are made similar to those described with respect to FIG. 15. Thus, in process step 187, the coordinates of the vector which extends from the tool center point location toward the target point are determined. Using this information, in step 188 the distance $S_T$ between the tool center point location and the target point is calculated. Finally, the coordinates of the next position $P_{SK}$ along the new vector to which the tool center point will go in one iteration is calculated in process step 189. The coordinates $X_{SK}$, $Y_{SK}$, $Z_{SK}$ of this location are stored in a predetermined location for access by cycle control 23.

Following step 190, the subroutine of FIG. 22 is terminated and returns to the end of the subroutine of FIG. 21. The end of the subroutine of FIG. 21, in turn, returns to the routine of FIG. 16 just before process step 169.

Figure 23:
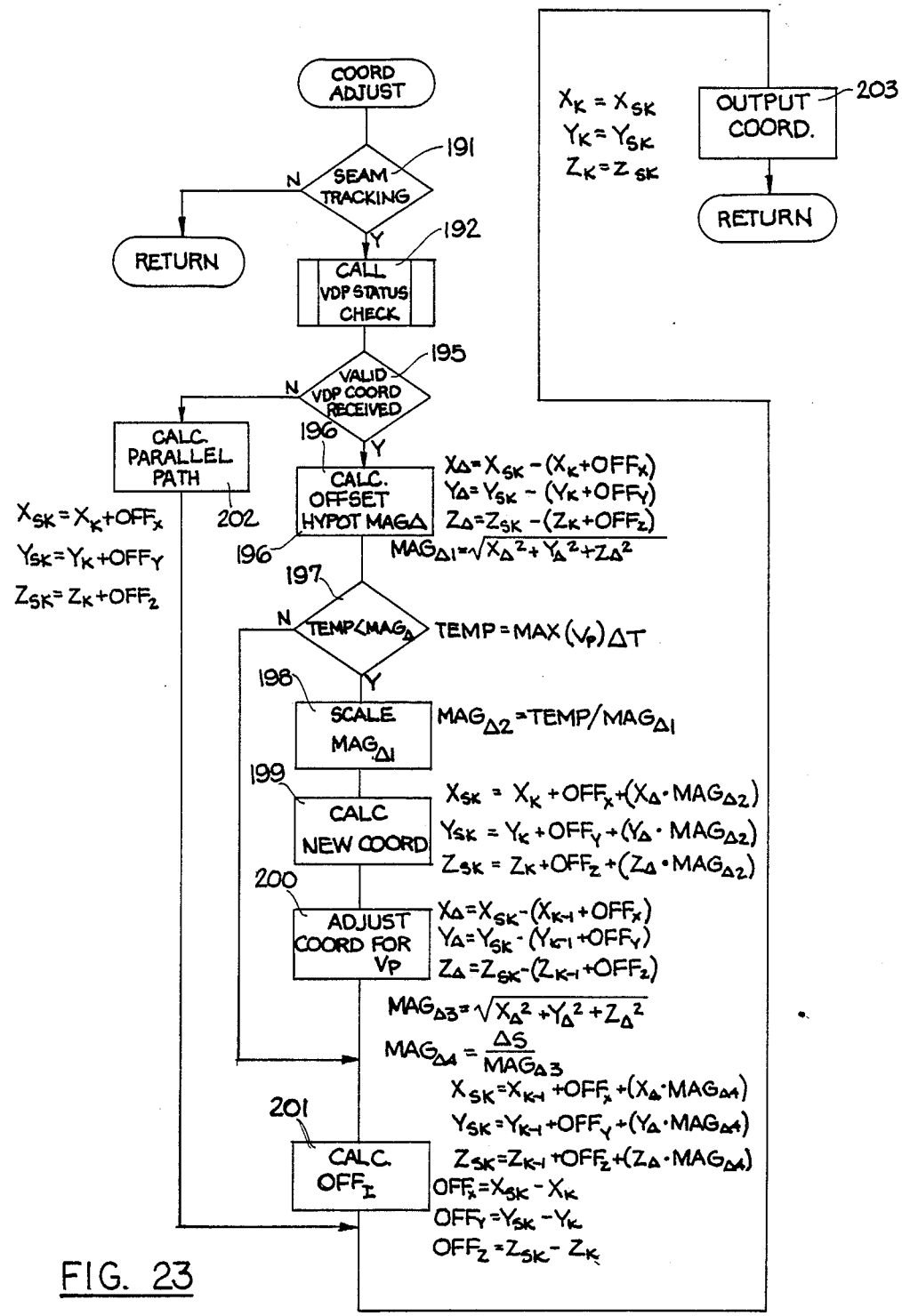
FIG. 23 is a flow chart representing the coordinate adjust routine.

FIG. 23 illustrates a subroutine performed by cycle control 23. It will be remembered that this subroutine is called up by step 129 of subroutine of FIG. 11.

There may be occasions when the correction called for by the vision data processor 24 in conjunction with the vision tracking system is greater than a maximum correction programmed by the manipulator operator. If this occurs, it is necessary to adjust or scale down this correction. This compression of the correction is the purpose of the subroutine of FIG. 23.

This subroutine begins with decision step 191 whereby it is determined whether or not seam tracking is taking place. If the answer is no, the subroutine of FIG. 23 terminates, returning to the subroutine of FIG. 11. If the answer is yes, the subroutine of FIG. 23 will call for a status check in process step 192. Process step 192 will call up the vision data processor status check subroutine illustrated in FIG. 24. The subroutine of FIG. 24 begins with a decision step 193 which checks for an error on the vision data board. If no error is found, the NO bypass line terminates the subroutine of FIG. 24 which returns to the subroutine of FIG. 23 just below process step 192.

Figure 24:
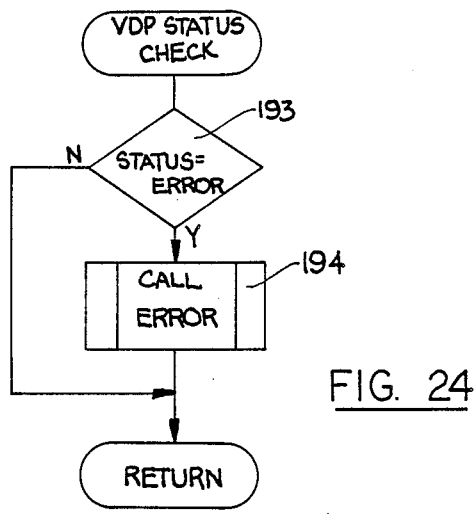
FIG. 24 is a flow chart of a subroutine of FIG. 23.

If decision step 193 of FIG. 24 determines that an error exists, process step 194 reacts appropriately, depending on the nature of the error. Depending upon the error, process step 194 is capable of reporting the error to the manipulator operator; stopping the manipulator; turning on warning lights or the like; taking the manipulator out of cycle; etc. Process step 194 terminates the subroutine of FIG. 24. Whether the subroutine of FIG. 24 will return to the subroutine of FIG. 23 following process step 94 depends upon the action taken during process step 94.

Returning to FIG. 23, assuming that the subroutine of FIG. 24 returns to FIG. 23 just below process step 192, the next step 195 in the subroutine is a decision step to determine whether or not valid vision data processing coordinates have been received by cycle control 23. These coordinates are designated $X_{SK}$, $Y_{SK}$, and $Z_{SK}$. If it is determined that these coordinates are valid, step 196 calculates the coordinate components $X_\Delta$, $Y_\Delta$, and $Z_\Delta$ of the vector which extends from the last interpolated point produced by step 95 of FIG. 7, including any previous offset, (which point has coordinates $X_K+OFF_X$, $Y_K+OFF_Y$, and $Z_K+OFF_Z$) toward the new target point $X_{SK}$, $Y_{SK}$, and $Z_{SK}$. By taking the square root of the sum of the squares of the vector coordinates, the distance $MAG_{\Delta 1}$ between these points is calculated.

Process step 196 is followed by decision step 197 wherein it is determined whether $MAG_{\Delta 1}$ exceeds a limit permitted for deviation from the programmed path. A temporary holding variable TEMP is defined as the product MAX $(V_P)$ $\Delta T$, where MAX is a maximum correction value (from 0 to 1.5) preprogrammed by the manipulator operator, $V_P$ is the programmed velocity and $\Delta T$ is the time of one increment interval. Therefore, $(V_P)$ $\Delta T$ constitutes the increment distance at programmed velocity and TEMP represents a multiple of this distance.

If TEMP is not less than $MAG_{\Delta 1}$, the next three process steps 198, 199 and 200 are bypassed by the NO bypass line. If TEMP is less than $MAG_{\Delta 1}$, it is known that the vision data point $P_{SK}$ lies at a distance on vector $X_\Delta$, $Y_\Delta$, and $Z_\Delta$ greater than the preprogrammed limit. At process steps 198 and 199 new values for $X_{SK}$, $Y_{SK}$, and $Z_{SK}$ are produced which place location $P_{SK}$ on the same vector, the magnitude of TEMP away from $P_K$. The coordinate components of this vector with magnitude TEMP are defined as the product of TEMP and the ratio of the coordinate components $X_\Delta$, $Y_\Delta$, $Z_\Delta$ to the magnitude $MAG_{\Delta 1}$. For the sake of efficiency the common division is done first at process step 198 by dividing TEMP by $MAG_{\Delta 1}$ to create $MAG_{\Delta 2}$. In process step 199, a set of new values for $X_{SK}$, $Y_{SK}$, $Z_{SK}$ is calculated using $MAG_{\Delta 2}$. This new point $X_{SK}$, $Y_{SK}$, $Z_{SK}$ lies along the original vector $X_\Delta$, $Y_\Delta$, $Z_\Delta$ at a distance from the point at which the manipulator would have placed the tool center line equal to TEMP.

Process step 200 forces the actual distance $MAG_{\Delta 3}$ between the points $P_{SK}$ and $P_{K-1}$ to equal $\Delta S$. First, the actual distance between the tool center point location, i.e., $X_{K-1}+OFF_X$, $Y_{K-1}+OFF_Y$, $Z_{K-1}+OFF_Z$ and the newly calculated $X_{SK}$, $Y_{SK}$, $Z_{SK}$ is computed by calculating the coordinate component differences $X_\Delta$, $Y_\Delta$, and $Z_\Delta$ and then extracting the square root of the sum of their squares. This distance is designated as $MAG_{\Delta 3}$. Next the distance on the vector to $P_{SK}$ from $P_{K-1}$ is scaled to the increment distance $\Delta S$ using the same procedure as shown at steps 198 and 199. Specifically, a magnitude $MAG_{\Delta 4}$ is calculated by dividing $\Delta$ by $MAG_{\Delta 3}$. Utilizing $MAG_{\Delta 4}$ the coordinates of a third and final target point $X_{SK}$, $Y_{SK}$, $Z_{SK}$ are calculated. This point constitutes a final target point corrected both as to distance and velocity. Finally, in process step 201, the X, Y, and Z offsets are calculated as shown.

If in the decision step 195 it had been determined that no valid coordinates had been received, the cycle control would simply have calculated a path parallel to the programmed path and offset therefrom by any offset existing at that time. This is shown in process step 202.

At process step 203 the adjusted point is substituted for the point $X_K$, $Y_K$ and $Z_K$ in the subroutine of FIG. 11. Either of process steps 201 or 202 terminate this subroutine and the process is returned to the subprocess of FIG. 11.

The invention has now been described in detail. Modifications may be made in the invention without departing from the spirit of it.

We claim:

1. A method of controlling a manipulator to effect motion of a tool centerpoint associated with a function element carried by the manipulator such that the tool centerpoint moves along a path detected by a sensor during execution of a program defining a cycle of operation of the manipulator, the method comprising the steps of:
   a. periodically producing intermediate point signals representing coordinates of an intermediate location along a predetermined path between two programmed locations, the intermediate location defining displacement along the predetermined path to be effected in a predetermined time interval;
   b. producing target coordinate signals in response to the intermediate point signals and the sensor, the target coordinate signals representing coordinates of a location to which the tool centerpoint is to be moved in the direction from the tool centerpoint current location toward the detected path;
   c. calculating a limit value defining, for the predetermined time interval, a maximum deviation of the path of actual tool centerpoint motion from the predetermined path;
   d. calculating coordinates of a predicted location of the tool centerpoint, the predicted location being defined by the intermediate point and an offset between the current tool centerpoint location and the immediately preceding intermediate point;
   e. calculating the magnitude of the distance between the target point and the predicted location;
   f. determining whether the magnitude of the distance exceeds the limit value; and
   g. modifying the target coordinate signals in response to determining that the magnitude of the distance exceeds the limit value, the modified target coordinate signals defining a location to produce a deviation equal to the limit.

2. The method of claim 1 wherein the step of producing target coordinate signals further comprises the steps of:
   a. periodically producing detected path signals representing coordinates of a location on the detected path to which the tool centerpoint is to be moved;
   b. calculating an incremental distance magnitude defining the distance through which the tool centerpoint is to be moved in the predetermined time interval; and
   c. calculating coordinates of a location the incremental distance from the current tool centerpoint in the direction toward the location on the detected path.

3. The method of claim 2 wherein the programmed cycle of operation defines a program velocity and the limit value is calculated as a distance through which the tool centerpoint would move in the predetermined time interval at a rate proportional to the program velocity.

4. The method of claim 2 wherein the step of periodically producing detected path signals further comprises the steps of:
   a. periodically producing sensor coordinate signals representing the coordinates of the location on the detected path relative to a frame of reference defined by the sensor;
   b. transforming the sensor coordinates to define the location relative to a frame of reference associated with the manipulator;
   c. selecting transformed sensor coordinates which represent a location at least a predetermined distance from the location represented by the immediately previously selected coordinates;
   d. storing the selected transformed coordinates; and
   e. periodically recalling stored selected transformed coordinates.

5. The method of claim 4 wherein the step of producing target coordinates further comprises the step of selecting detected path signals which represent a location more than twice the incremental distance from the current location of the tool centerpoint.

6. The method of claim 1 wherein the sensor is a vision system including a laser scanner/camera head which is fixedly mounted to the function element.

7. The method of claim 6 wherein the programmed cycle of operation defines changes of orientation of the function element between the two programmed locations.

8. An apparatus for controlling a manipulator to effect motion of a tool centerpoint associated with a function element carried by the manipulator such that the tool centerpoint moves along a path detected by a sensor during execution of a program defining a cycle of operation of the manipulator, the apparatus comprising;
   a. means for periodically producing intermediate point signals representing coordinates of an intermediate location along a predetermined path between two programmed locations, the intermediate location defining displacement along the predetermined path to be effected in a predetermined time interval;
   b. means for producing target coordinate signals in response to the intermediate point signals and the sensor, the target coordinate signals representing coordinates of a location to which the tool centerpoint is to be moved in the direction from the tool centerpoint current location toward the detected path;
   c. means for calculating a limit vale defining, for the predetermined time interval, a maximum deviation of the path of actual tool centerpoint motion from the predetermined path;
   d. means for calculating coordinates of a predicted location of the tool centerpoint, the predicted location being defined by the intermediate point and an offset between the current tool centerpoint location and the immediately preceding intermediate point;
   e. means for calculating the magnitude of the distance between the target point and the predicted location;
   f. means for determining whether the magnitude of the distance exceeds the limit value; and
   g. means responsive to the determining means for modifying the target coordinate signals to define a location resulting in a deviation equal to the limit.

9. An apparatus in accordance with claim 8 wherein the means for producing target coordinate signals further comprises:

a. means for periodically producing detected path signals representing coordinates of a location on the detected path to which the tool centerpoint is to be moved;

b. means for calculating an incremental distance magnitude defining a distance through which the tool centerpoint is to be moved in the predetermined time interval; and c. means for calculating coordinates of a location the incremental distance from the current tool centerpoint location in the direction toward the location defined by the detected path signals.

10. The apparatus in accordance with claim 9 wherein the programmed cycle of operation defines a program velocity between the two predetermined points and the means for calculating the limit value calculates a distance through which the tool centerpoint would move in the predetermined time interval at a rate proportional to the program velocity.

11. An apparatus in accordance with claim 9 wherein the means for producing detected path signals further comprises:

a. means for periodically producing sensor coordinate signals representing the coordinates of the location on the detected path relative to a frame of reference defined by the sensor;

b. means for calculating transformed sensor coordinates defining the location on the detected path relative to a frame of reference associated with the manipulator;

c. means for selecting transformed sensor coordinates which represent a location at least a predetermined distance from the location of the immediately previously selected transformed sensor coordinates; and d. means for storing the selected transformed sensor coordinates.

12. The apparatus in accordance with claim 11 wherein the means for producing target coordinate signals further comprises means for selecting detected path signals which represent a location more than twice the incremental distance for the current location of the tool centerpoint.

13. The apparatus in accordance with claim 8 wherein the sensor is a vision system including a laser scanner/camera head which is fixedly mounted to the function element.

14. The apparatus in accordance with claim 13 wherein the programmed cycle of operation defines a change of orientation of the function element between the two programmed locations.

* * * * *

UNITED STATES PATENT AND TRADEMARK OFFICE
CERTIFICATE OF CORRECTION

PATENT NO. : 4,969,108
DATED : November 6, 1990
INVENTOR(S) : Gregory Webb and Keith R. Wehmeyer It is certified that error appears in the above-identified patent and that said Letters Patent is hereby corrected as shown below:

Claim 2, column 23, line 59 - insert "location" after "centerpoint"

Claim 12, column 26, line 16 "for" should read "from"

Signed and Sealed this

Second Day of June, 1992

*Attest:*

DOUGLAS B. COMER

*Attesting Officer*      *Acting Commissioner of Patents and Trademarks*